United States Patent
Kettaneh et al.

(10) Patent No.: US 8,494,798 B2
(45) Date of Patent: Jul. 23, 2013

(54) AUTOMATED MODEL BUILDING AND BATCH MODEL BUILDING FOR A MANUFACTURING PROCESS, PROCESS MONITORING, AND FAULT DETECTION

(75) Inventors: Nouna Kettaneh, Hollis, NH (US); Svante Bjarne Wold, Hollis, NH (US)

(73) Assignee: MKS Instruments, Inc., Andover, MA (US)

( * ) Notice: Subject to any disclaimer, the term of this patent is extended or adjusted under 35 U.S.C. 154(b) by 637 days.

(21) Appl. No.: 12/202,848

(22) Filed: Sep. 2, 2008

(65) Prior Publication Data

US 2010/0057237 A1    Mar. 4, 2010

(51) Int. Cl.
    *G01N 37/00*    (2006.01)

(52) U.S. Cl.
    USPC .......................................................... 702/83

(58) Field of Classification Search
    USPC .......................................................... 702/83
    See application file for complete search history.

(56) References Cited

U.S. PATENT DOCUMENTS

| | | | |
|---|---|---|---|
| 5,135,688 A | 8/1992 | Nakamura et al. | |
| 5,149,472 A | 9/1992 | Suganuma | |
| 5,173,224 A | 12/1992 | Nakamura et al. | |
| 5,403,433 A | 4/1995 | Morrison et al. | 156/626 |
| 5,408,405 A | 4/1995 | Mozumder et al. | 364/151 |
| 5,442,562 A | 8/1995 | Hopkins et al. | 364/468 |
| 5,469,361 A | 11/1995 | Moyne | 364/468 |
| 5,479,340 A | 12/1995 | Fox et al. | 364/153 |
| 5,544,256 A | 8/1996 | Brecher et al. | 382/149 |
| 5,485,471 A | 12/1996 | Nishizawa et al. | |
| 5,710,700 A | 1/1998 | Kurtzberg et al. | 364/149 |
| 5,786,999 A | 7/1998 | Spahr et al. | |
| 5,815,397 A | 9/1998 | Saito et al. | |
| 5,885,624 A | 3/1999 | Katsuta et al. | |
| 5,900,633 A | 5/1999 | Solomon et al. | 250/339.08 |
| 5,949,678 A | 9/1999 | Wold et al. | 364/188 |
| 5,993,704 A | 11/1999 | Bader | |
| 5,997,778 A | 12/1999 | Bulgrin | |
| 6,090,318 A | 7/2000 | Bader et al. | |
| 6,153,115 A | 11/2000 | Le et al. | 216/60 |
| 6,336,082 B1 | 1/2002 | Nguyen et al. | 702/179 |
| 6,354,145 B1 | 3/2002 | Fransson et al. | 73/61.52 |

(Continued)

FOREIGN PATENT DOCUMENTS

| DE | 101 14 211 A1 | 11/2001 |
|---|---|---|
| DE | 100 40 731 A1 | 3/2002 |

(Continued)

OTHER PUBLICATIONS

Ahmed S. F., A New Approach in Industrial Automation Application "Embedded System Design for Injection Molding Machine," IEEE Xplore, Oct. 29, 2009, 5 pages.

(Continued)

*Primary Examiner* — Aditya Bhat
(74) *Attorney, Agent, or Firm* — Proskauer Rose LLP

(57) ABSTRACT

A method for creating a new model of a manufacturing process according to a multivariate analysis including selecting a set of data representative of multidimensional data measured during a step or phase of a manufacturing process. The method also includes determining a set of model generation conditions based on the set of data and generating the new model specifying intervals for the multidimensional data measured during a future manufacturing process based on the set of model generation conditions.

19 Claims, 21 Drawing Sheets

U.S. PATENT DOCUMENTS

| | | | |
|---|---|---|---|
| 6,368,883 B1 | 4/2002 | Bode et al. | 438/14 |
| 6,442,445 B1 | 8/2002 | Bunkofske et al. | 700/108 |
| 6,453,246 B1 | 9/2002 | Agrafiotis et al. | 702/27 |
| 6,456,899 B1 | 9/2002 | Gleason et al. | 700/212 |
| 6,528,331 B1 | 3/2003 | Bode et al. | 438/14 |
| 6,556,884 B1 | 4/2003 | Miller et al. | 700/121 |
| 6,564,119 B1 | 5/2003 | Vaculik et al. | 700/146 |
| 6,584,368 B2 | 6/2003 | Bunkofske et al. | 700/83 |
| 6,594,620 B1 | 7/2003 | Qin et al. | 702/185 |
| 6,607,577 B2 | 8/2003 | Vaculik et al. | 75/375 |
| 6,678,569 B2 | 1/2004 | Bunkofske et al. | 700/108 |
| 6,682,669 B2 | 1/2004 | Bulgrin et al. | |
| 6,718,224 B2 | 4/2004 | Firth et al. | 700/121 |
| 6,721,616 B1 | 4/2004 | Ryskoski | 700/108 |
| 6,741,903 B1 | 5/2004 | Bode et al. | 700/121 |
| 6,801,831 B2 | 10/2004 | Sasaki | |
| 6,830,939 B2 | 12/2004 | Harvey et al. | 438/8 |
| 6,839,655 B2 | 1/2005 | Gross et al. | 702/179 |
| 6,876,931 B2 | 4/2005 | Lorenz et al. | 702/22 |
| 6,917,839 B2 | 7/2005 | Bickford | 700/30 |
| 6,967,899 B1 | 11/2005 | O'Brien, Jr. et al. | 367/131 |
| 6,968,253 B2 | 11/2005 | Mack et al. | 700/121 |
| 6,975,944 B1 | 12/2005 | Zenhausern | 702/22 |
| 6,983,176 B2 | 1/2006 | Gardner et al. | 600/310 |
| 7,003,490 B1 | 2/2006 | Keyes | 705/38 |
| 7,031,800 B2 | 4/2006 | Bulgrin | |
| 7,043,401 B2 | 5/2006 | Taguchi et al. | 702/183 |
| 7,062,417 B2 | 6/2006 | Kruger et al. | |
| 7,072,794 B2 | 7/2006 | Wittkowski | 702/179 |
| 7,107,491 B2 | 9/2006 | Graichen et al. | 714/37 |
| 7,151,976 B2 | 12/2006 | Lin | 700/108 |
| 7,189,964 B2 | 3/2007 | Castro-Perez et al. | |
| 7,191,106 B2 | 3/2007 | Minor et al. | 703/2 |
| 7,198,964 B1 | 4/2007 | Cherry et al. | |
| 7,216,005 B2 | 5/2007 | Shioiri et al. | |
| 7,313,454 B2 | 12/2007 | Hendler et al. | 700/110 |
| 7,465,417 B2 | 12/2008 | Hutson et al. | |
| 7,597,827 B2 | 10/2009 | Frey | |
| 7,622,308 B2 | 11/2009 | Hendler et al. | |
| 2002/0038926 A1 | 4/2002 | Vaculik et al. | 266/90 |
| 2002/0143472 A1 | 10/2002 | Mutter | 702/20 |
| 2003/0011376 A1 | 1/2003 | Matsushita et al. | 324/500 |
| 2003/0065462 A1 | 4/2003 | Potyrailo | 702/81 |
| 2003/0182281 A1 | 9/2003 | Wittkowski | 707/5 |
| 2004/0055888 A1 | 3/2004 | Wikiel et al. | 205/81 |
| 2004/0064259 A1 | 4/2004 | Haaland et al. | |
| 2004/0064357 A1 | 4/2004 | Hunter et al. | 705/10 |
| 2004/0083065 A1 | 4/2004 | Daniel et al. | |
| 2004/0116814 A1 | 6/2004 | Stranc et al. | 600/473 |
| 2004/0122859 A1 | 6/2004 | Gavra et al. | 707/104.1 |
| 2004/0153815 A1 | 8/2004 | Volponi | 714/37 |
| 2004/0186603 A1 | 9/2004 | Sanford et al. | 700/95 |
| 2004/0215424 A1 | 10/2004 | Taguchi et al. | 702/189 |
| 2004/0225377 A1 | 11/2004 | Kokotov et al. | 700/1 |
| 2004/0228186 A1 | 11/2004 | Kadota | 365/202 |
| 2004/0254762 A1 | 12/2004 | Hopkins et al. | |
| 2004/0259276 A1* | 12/2004 | Yue et al. | 438/5 |
| 2005/0028932 A1 | 2/2005 | Shekel et al. | 156/345.15 |
| 2005/0037515 A1 | 2/2005 | Nicholson et al. | 436/173 |
| 2005/0043902 A1 | 2/2005 | Haaland et al. | 702/30 |
| 2005/0045821 A1 | 3/2005 | Noji et al. | 250/311 |
| 2005/0060103 A1 | 3/2005 | Chamness | 702/30 |
| 2005/0130321 A1 | 6/2005 | Nicholson et al. | 436/518 |
| 2005/0251276 A1 | 11/2005 | Shen | 700/108 |
| 2005/0268197 A1 | 12/2005 | Wold | 714/746 |
| 2006/0039598 A1 | 2/2006 | Kim et al. | 382/145 |
| 2006/0058898 A1 | 3/2006 | Emigholz et al. | 700/29 |
| 2006/0111804 A1 | 5/2006 | Lin | 700/110 |
| 2006/0122807 A1 | 6/2006 | Wittkowski | 702/179 |
| 2006/0184264 A1 | 8/2006 | Willis et al. | 700/108 |
| 2007/0021859 A1 | 1/2007 | Lev-Ami et al. | 700/121 |
| 2008/0010531 A1 | 1/2008 | Hendler et al. | 714/33 |
| 2008/0082195 A1* | 4/2008 | Samardzija | 700/109 |
| 2008/0221720 A1 | 9/2008 | Hendler et al. | 700/109 |
| 2009/0037013 A1* | 2/2009 | Hendler et al. | 700/103 |
| 2009/0055140 A1 | 2/2009 | Kettaneh et al. | |
| 2009/0164171 A1 | 6/2009 | Wold et al. | |
| 2009/0287320 A1 | 11/2009 | MacGregor et al. | |
| 2010/0057237 A1 | 3/2010 | Kettaneh et al. | |
| 2010/0191361 A1* | 7/2010 | McCready et al. | 700/104 |

FOREIGN PATENT DOCUMENTS

| | | |
|---|---|---|
| EP | 0 524 317 | 2/1992 |
| GB | 2 394 312 | 11/2001 |
| GB | 2 441 640 | 3/2008 |
| JP | 02-120019 | 5/1990 |
| WO | 03/085504 | 10/2003 |
| WO | 03/103024 | 12/2003 |
| WO | 2004/019147 | 3/2004 |
| WO | 2004/046835 | 6/2004 |
| WO | 2007/046945 | 4/2007 |

OTHER PUBLICATIONS

Bai, et al., "IMPOS: A Method and System for Injection Molding Optimization," IEEE Xplore, Oct. 29, 2009, 5 pages.

C. E. Castro, et al., "Multiple criteria optimization with variability considerations in injection molding," *Polymer Engineering and Science*, vol. 47, p. 400, 2007.

C. M. Seaman, et al., "Multiobjective optimization of a plastic injection molding process," *IEEE Transactions on Control Systems Technology*, vol. 2, No. 3, pp. 157-168, 1994.

Chen, et al., "Application of Advanced Process Control in Plastic Injection Molding," IEEE Xplore, Oct. 29, 2009, 6 pages.

Chen, et al., "Injection Molding Quality Control by Integrating Weight Feedback into a Cascade Closed-Loop Control System," Polymer Engineering and Science, 2007, 11 pages.

International Search Report for International Application No. PCT/US2010/021486, Date of Mailing Jul. 5, 2010 (20 pages total).

D. Kazmer and C. Roser, "Evaluation of Product and Process Design Robustness," *Research in Engineering Design*, vol. 11, pp. 20-30, 1999.

D. Kazmer and S. Westerdale, "A model-based methodology for on-line quality control," *Int J Adv Manuf Technol*, vol. 42, pp. 280-292, 2009.

D. Kazmer, "Chapter 13: Quality Control," in *Plastics Manufacturing Systems Engineering*, ed Munich: Carl Hanser Verlag, 2009, pp. 387-418.

D. O. Kazmer, et al., "A Comparison of Statistical Process Control (SPC) and On-Line Multivariate Analyses (MVA) for Injection Molding," *International Polymer Processing*, vol. 23, pp. 447-458, 2008.

Dubay, et al., "An Investigation on the Application of Predictive Control for Controlling Screw Position and Velocity on an Injection Molding Machine," Polymer Engineering and Science, 2007, 10 pages.

Eriksson et al., Multi- and Megavariate Data Analysis: Part I Basic Principles and Applications (2nd. ed.), Umetrics Academy (2006).

Eriksson et al., Multi- and Megavariate Data Analysis: Part II Advanced Applications and Method Extensions (2nd. ed.), Umetrics Academy (2006).

Fugee Tsung, Jianjun Shi, C.F. J. Wu: "Joint Monitoring of PID-Controlled Processes" Journal of Quality Technology, vol. 31, No. 3, Jul. 1, 1999, pp. 275-285, XP002579609.

Fung, et al., "Application of a Capacitive Transducer for Online Part Weight Prediction and Fault Detection in Injection Molding," Polymer Engineering and Science, 2007, 7 pages.

G. Sherbelis, et al., "The Methods and benefits of Establishing a Process Window," in *Proceedings of the 55th Annual Technical Conference, ANTEC*, Part 1 (of 3), 1997, pp. 545-550.

J. W. Mann, "Process Parameter Control: the Key to Optimization," Plastics Engineering, vol. 30, pp. 25-27, 1974.

Knights, M., "Injection Mold Balance Unbalanced," Plastics Technology, http://www.ptonline.com/articles/200811fal.html; Nov. 2008, 5 pages.

Li, et al., "A Real-Time Process Optimization System for Injection Molding," Polymer Engineering and Science, 2009, 10 pages.

Li, et al., "Predicting the Parts Weight in Plastic Injection Molding Using Least Squares Support Vector Regression," IEEE Transactions on Systems, Man, and Cybernetics—Part C: Applications and Reviews, vol. 38, No. 6, Nov. 2008, 7 pages.

Liu, et al, "Identification and Autotuning of Temperature-Control System With Application to Injection Molding," IEEE Transactions on Control Systems Technology, vol. 17, No. 6, Nov. 2009, 13 pages.
M. Berins, "Standards for Molding Tolerances," in SPI Plastics Engineering Handbook of the Society of the Plastics Industy, Inc. (5th Edition) 5th ed: Kluwer Academic Publishers, 1991, pp. 821-844.
Mei, et al., "The Optimization of Plastic Injection Molding Process Based on Support Vector Machine and Genetic Algorithm," International Conference on Intelligent Computation Technology and Automation, 2008, 4 pages.
N. M. Morris and W. B. Rouse, "The Effects of Type of Knowledge Upon Human Problem Solving in a Process Control Task," *IEEE Transactions on Systems, Man and Cybernetics*, vol. SMC-15, No. 6 pp. 698-707, 1985.
N. Yonehara and I. Ito, "Finding an optimal operation conditions of plastic molding by artificial neural network," *Nippon Kikai Gakkai Ronbunshu, C Hen/Transactions of the Japan Society of Mechanical Engineers, Part C*, vol. 63, pp. 3538-3543, 1997.
P. Knepper and D. Kazmer, "Multi-objective velocity profile optimization," Charlotte, NC, United States, 2006, pp. 1093-1097.
R. H. Myers and D. C. Montgomery, "Response Surface Methodology: Process and Product Optimization Using Designed Experiments," in *Wiley Series in Probability and Statistics*, ed: Wiley Interscience, 1995, p. 248.
R. Ivester, et al., "Automatic tuning of injection molding by the virtual search method," *Journal of Injection Molding*, vol. 2/No. 3, Sep. 1998.
Shu, et al., "PID Neural Network Temperature Control System in Plastic Injecting-moulding Machine," Third International Conference on Natural Computation, 2007, 5 pages.
State space (controls), State space (controls)—Wikipedia, the free encyclopedia [online], 11 pages [retrieved on Sep. 14, 2010]. Retrieved from the Internet: <URL: http://en.wikipedia.org/wiki/State_Space_(controls)>.
Tan et al., "Adaptive Control of Ram Velocity for the Injection Moulding Machine," IEEE Transactions on Control Systems Technology, vol. 9, No. 4, Jul. 2001, 9 pages.
Triefenbach, F., "Design of Experiments: The D-Optimal Approach and Its Implementation As a Computer Algorithm," Bachelor's Thesis in Information and Communication Technology, Jan. 15, 2008, 84 pages.
Wold et al., "2.10 Batch Process Modeling and MSPC," in Comprehensive Chemometrics: Chemical and Biochemical Data Analysis, (Brown et al. Eds.), Oxford, UK: Elsevier, 37 pages (2009).
Yang J. H., "Nonlinear Adaptive Control for Injection Molding Machines," IEEE Xplore, Oct. 29, 2009, 6 pages.
You et al., "Research on Temperature Measure and Control Method in Mold-Temperature-Control Solidification," IEEE International Conference on Control and Automation WeCP-18, Guangzhou, China—May 30 to Jun. 1, 2007, 4 pages.
Ci, Chen et al., "Plasma Etch Modeling using Optical Emission Spectroscopy," J. Vac. Sci. Technol. A 14(3), May/Jun. 1996, pp. 1901-1906.
Gallagher et al., "Development and Benchmarking of Multivariate Statistical Process Control Tools for a Semiconductor Etch Process: Improving Robustness through Model Updating," IFAC ADCHEM'97, 78-83, Banff, Canada, Jun. 1997.
Goodlin et al., "Simultaneous Fault Detection and Classification for Semiconductor Manufacturing Tools," 201st Meeting of the Electrochemical Society, International Symposium on Plasma Processing XIV, Abs. 413, Philadelphia, PA, May 2002, 16 pages.
Goodlin et al., "Simultaneous Fault Detection and Classification for Semiconductor Manufacturing Tools," Journal of the Electrochemical Society, 150 (12), May. 12, 2002, pp. G778-G784.
"Hotelling's T squared," Engineering Statistics Handbook [online], Ch. 6.5.4.3, 2 pages [retrieved on Jan. 13, 2006]. Retrieved from the Internet: <URL: http://www.itl.nist.gov/div898/handbook/pmc/section5/pmc543.htm>.
Kresta et al., "Multivariate Statistical Monitoring of Process Operating Performance," The Canadian Journal of Chemical Engineering, vol. 69, Feb. 1991, pp. 35-47.
Jiang et al., "Fault Diagnosis for Batch Processes Based on Improved MFDA," 2005 IEEE International Conference on Systems Man, and Cybernetics, vol. 4, pp. 3420-3425, Oct. 10-12, 2005, IEEE, Piscataway, NJ, (ISBN 0-7803-9298-1).
Lymberopoulos et al., "Advanced Process Control Comes of Age," Semiconductor International [online], 5 pages, Jul. 1, 2004 [retrieved on Nov. 19, 2008]. Retrieved from the Internet: <URL: http://www.semiconductor.net/index.asp?layout=articlePrint&articleID=CA430898>.
Martin et al., "Multivariate Statistical Process Control and Process Performance Monitoring," IFAC Dynamics and Control of Process Systems, 1999, XP-000911903, pp. 347-356.
Mason et al., "Applying Hotelling's $T^2$ Statistic to Batch Processes," J. Quality Technology. vol. 33, No. 4, Oct. 2001, pp. 466-479.
"Pearson's Correlation Coefficient," Teach/Me Data Analysis [online], 2 pages [retrieved on Dec. 9, 2005]. Retrieved from the Internet: <URL: http://www.vias.org/tmdatanaleng/cc_corr_coeff.html>.
"Process Leaps Without New Hardware," EuroAsia Semiconductor [online], Nov. 2004, 3 pages [retrieved on Nov. 19, 2008]. Retrieved from the Internet: <URL http://www.euroasiasemiconductor.com/print_version.php?id=5677>.
Skumanich et al., "Advanced Etch Applications Using Tool-Level Data," Solid State Technology [online], 7 pages [retrieved on Jan. 27, 2005]. Retrieved from the Internet: <URL: http://sst.pennnet.com/articles/article_display.cfm?section=archi&article_id=206470&vers...>.
Smith et al., "From Sensor Data to Process Control: A Networked Framework," Semiconductor Manufacturing Magazine, Jul. 2004, 6 pages.
Smith et al., "Practical, Real-Time Multivariate FDC," Semiconductor International [online], Dec. 1, 2004, 6 pages [retrieved on Dec. 16, 2005]. Retrieved from the Internet: <URL: http://www.reed-electronics.com/semiconductor/index.asp?layout=articlePrint&articleID=CA483628>.
Solomon et al., "Real-Time Measurement of Film Thickness, Composition, and Temperature by FT-IR Emission and Reflection Spectroscopy," Semiconductor Characterization: Present Status and Future Needs, AIP Press, 1996, pp. 544-548.
"TOOLweb Blue Box Professional: Enabling High Speed, Multi-User Connectivity and Data Sharing," Control & Information Technology [online], Mar. 2005, 4 pages [retrieved on Nov. 19, 2008]. Retrieved from the Internet: <URL: http://www.mksinst.com/docs/ur/ipcblueds.pdt>.
"TOOLweb Applications Support: AEC/APC Applications Engineering, Integration and Deployment Support," Control & Information Technology [online], Sep. 2005, 4 pp. [retrieved on Nov. 19, 2008]. Retrieved from the Internet: <URL: http://www.mksinst.com/docs/UR/TWT3DS.pdf>.
"TOOLweb: APC & e-Diagnostics Suite," Control & Information Technology [online], 4 pages [retrieved on Nov. 19, 2008]. Retrieved from the Internet: <URL: http://www.mksinst.com/docs/ur/twmvads.pdf>.
"TOOLweb SenseLink: Web-Enables Existing Sensors," Control & Information Technology [online], 4 pages [retrieved on Nov. 19, 2008]. Retrieved from the Internet: <URL: http://www.mksinst.com/docs/ur/twsenselinkds.pdf>.
"User's Guide to SIMCA-P, SIMCA-P+," Umetrics AB, Version 11.0, May 17, 2005, pp. 1-456.
Wang et al., "Process Monitoring in Principal Component Subspace: Part 1. Fault Reconstruction Study," 2004 IEEE International Conference on Systems, Man and Cybernetics, The Hague, The Netherlands, vol. 6, Oct. 10-13. 2004, pp. 5119-5124.
Wold et al., "Hierarchical Multiblock PLS and PC Models for Easier Model Interpretation and as an Alternative to Variable Selection," Journal of Chemometrics, vol. 10, 1996, pp. 463-482.
Wold et al., "Modelling and Diagnostics of Batch Processes and Analogous Kinetic Experiments," Chemometrics and Intelligent Laboratory Systems, vol. 44, Nos. 1-2, 1998, pp. 331-340.
Zhao et al., "A Novel Combination Method for On-Line Process Monitoring and Fault Diagnosis," IEEE ISIE 2005, Dubrovnik, Croatia, Jun. 20-23, 2005, pp. 1715-1719.

\* cited by examiner

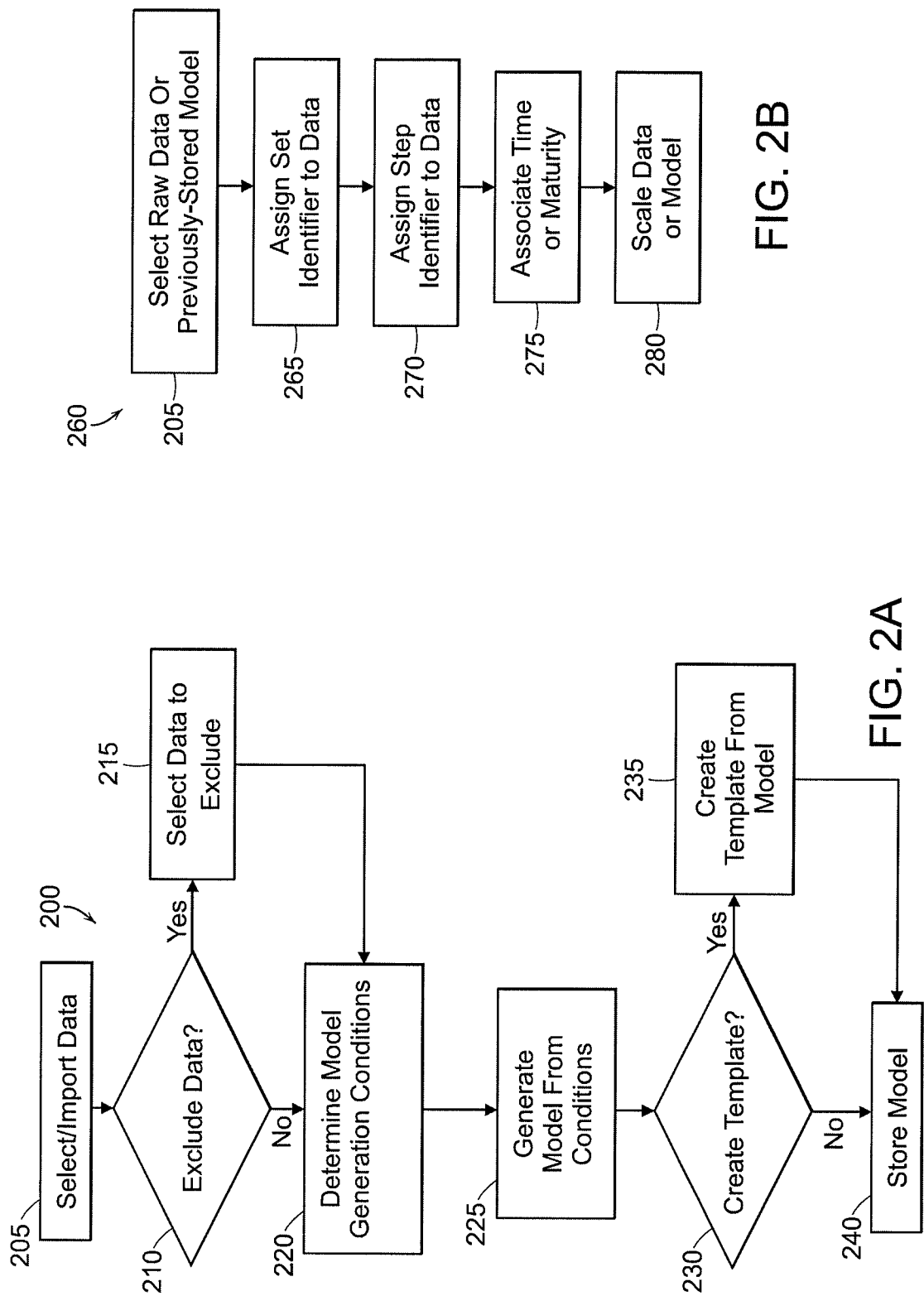

FIG. 4B

| | Batch ID | Wafer (Batch) | Interval (F Time | Phase ID PM1CurrentStepNum |
|---|---|---|---|---|
| Primar ▸ | ▸ | ▸ | 2 ▸ | 3 ▸ |
| 2 | ▸ | 90PEQ54SJE5 | 1 | 28 | 1 |
| 3 | ▸ | 90PEQ54SJE5 | 1 | 29 | 1 |
| 4 | ▸ | 90PEQ54SJE5 | 1 | 29.9 | 1 |
| 5 | ▸ | 90PEQ54SJE5 | 1 | 30.7 | 1 |
| 6 | ▸ | 90PEQ54SJE5 | 1 | 31.8 | 2 |
| 7 | ▸ | 90PEQ54SJE5 | 1 | 32.8 | 2 |
| 8 | ▸ | 90PEQ54SJE5 | 1 | 34.2 | 2 |
| 9 | ▸ | 90PEQ54SJE5 | 1 | 35.1 | 3 |
| 10 | ▸ | 90PEQ54SJE5 | 1 | 35.8 | 3 |
| 11 | ▸ | 90PEQ54SJE5 | 1 | 36.9 | 3 |
| 12 | ▸ | 90PEQ54SJE5 | 1 | 37.7 | 3 |
| 13 | ▸ | 90PEQ54SJE5 | 1 | 38.8 | 3 |
| 14 | ▸ | 90PEQ54SJE5 | 1 | 39.8 | 3 |

Import Data Wizard

The spreadsheet shows the color coded dataset. Use the arrows on the spreadsheet buttons or the formatting buttons to format the spreadsheet.

Variable IDs
☐ Primary
☐ Secondary

Observation IDs
☐ Primary
☐ Secondary ID ▸

Data
☐ X Variable ▸

Other
☐ Exclude
Missing Value ☐

Commands ▸

< Back    Next >    Cancel    Help

Phases

The following phases were found in the dataset. Please select the correct time/maturity variable for each phase. You may also delete, merge and rename the phases.

Phases found in the dataset: The dataset contains 132 batches.

| Phase - Variables | Obs / Batch | Comments |
|---|---|---|
| 3 | 6592 / 132 | 45 included variables, using $Time as Y, |
| 4 | 11187 / ... | 45 included variables, using $Time as Y, |
| 5 | 6585 / 132 | 45 included variables, using $Time as Y, |
| 6 | 1328 / 132 | 45 included variables, using $Time as Y, |
| 7 | 248 / 132 | Deleted |
| 8 | 1348 / 132 | 45 included variables, using $Time as Y, |
| 9 | 1332 / 132 | 45 included variables, using $Time as Y, |
| 10 | 1982 / 132 | 45 included variables, using $Time as Y, |
| 11 | 542 / 132 | 45 included variables, using $Time as Y, |
| 12 | 5366 / 132 | Deleted |

Time/Maturity variable for the selected phase: $Time - auto-generated by UmProjectBuilder

[Rename] [Merge] [Reset] [Undo Delete]

[< Back] [Next >] [Cancel] [Help]

FIG. 4F

Batches

494b

The list below gives a summary of the batches found in the dataset. Batches may be deleted.

Available batches: 132, included: 132

| Batch - Phase | Num O... ▽ | Comments |
|---|---|---|
| 90304R67SEH1 | 252 | 499 |
| 90333095TCC4 | 254 | |
| 90PEB062SJC3 | 254 | |
| 90PEP055SJB1 | 254 | |
| 90304R60SEG7 | 255 | |
| 90333084TCB1 | 255 | |
| 90PEB030SJC4 | 255 | |
| 90PEB067SJB4 | 255 | |
| 90304K1ISEA7 | 255 | |
| 90PEP051SJG2 | 255 | |
| 90304M53SEE6 | 255 | |
| 90302V30SED7 | 256 | |

496b

[Import Local Centering...] [Conditional Delete...] [Delete]

[< Back] [Next >]    495    497    [Cancel] [Help]

FIG. 4G

| | A | B | C | D | E | F | G | H | I | J | K | L | M |
|---|---|---|---|---|---|---|---|---|---|---|---|---|---|
| | Primary ID | PM1Heliur | PM1Heliur | PM1Thrott | PM1O2Hig | PM1C4F8 | PM1CF4F | PM1N2Flo | PM1O2Lo | PM1CHF3 | PM1COFl | PM1H2FlowAl | |
| 1stdev | | | | | 2 | 4 | | 3 | | | | | |
| 1ws | | | 3 | 1.5 | | | | | | 1.5 | | | |
| 1percent | | 5 | 3 | | | | | | | | | | |
| 1modifier | | | | | | | | | | | | | |
| 3mean | | 1.4 | 20 | | 0 | 0 | 45 | 0 | 15 | | 0.5 | 1.5 | |
| 3ws | | 3.5 | 1 | | 1.5 | 1.5 | 1.3 | 1.5 | 3 | 1.5 | 0.5 | 1.5 | |

FIG. 6A

Import Scaling

Check the correct Variable ID Row and Phase/Scale Column (if phase and scale are in the same column, it should have the following formating "PhaseNameMean" "PhaseNamestdev" or "PhaseNameModifier").

| | 1 | 2 | 3 | 4 | |
|---|---|---|---|---|---|
| | Primary ID | PM1Heli | PM1Heli | PM1Thro | PM1 |
| 1 | 1mean | | | | |
| 2 | 1ws | | | | |
| 3 | | | | | |
| 4 | 2mean | 1.45 | 20 | | |
| 5 | 2stdev | 3.5 | 1 | | |
| 6 | 3mean | 1.4 | 20 | | |
| 7 | 3percent | 3.5 | 1 | | |
| 8 | 4mean | 1.35 | 20 | | |
| 9 | 4modifier | 3.5 | 1 | | |
| 10 | 5mean | 1.35 | 20 | | |

☐ Variable
☐ Phase/Scale
☐ Scale
☐ Include
☐ Excluded

▸ Commands

< Back | Next > | Finish | Cancel | Help

Batch

Use "Crop" to exclude observations from the beginning or the end of the selected phase(s), and to remove observations by setting a limit on a variable.

Phases

| Phase | Obs | Bat... | Me... | Ratio |
|-------|------|--------|-------|--------|
| 1 | 2420 | 132 | 19 | 1.400 |
| 2 | 662 | 132 | 5 | 1.500... |
| 3 | 6592 | 132 | 50 | 1.062... |
| 4 | 11... | 132 | 85 | 1.036... |
| 5 | 6585 | 132 | 50 | 1.062... |
| 6 | 1328 | 132 | 10 | 1.222... |
| 7 | 248 | 132 | 2 | 3.000... |
| 8 | 1348 | 132 | 10 | 1.571... |
| 9 | 1332 | 132 | 10 | 1.222... |
| 10 | 1982 | 132 | 15 | 1.285... |
| 11 | 542 | 132 | 4 | 5.000... |
| 12 | 5366 | 132 | 35 | 10.66... |

758

Trim/Crop description.
10: 10 first observations excluded from each batch/ph
------Excluded Phases------
Exclude Phase : '6'
Exclude Phase : '7'
Exclude Phase : '12'

756

Crop/Exclude  UnCrop/Incl...  Down size...    Remove

754

< Back    Next >    Finish    Cancel    Help

760

752

AUTOMATED MODEL BUILDING AND BATCH MODEL BUILDING FOR A MANUFACTURING PROCESS, PROCESS MONITORING, AND FAULT DETECTION

TECHNICAL FIELD

The technology relates generally to manufacturing processes and particularly to automated model building, batch model building for a manufacturing process and statistical process control (and multivariate statistical process control) including process monitoring and fault detection.

BACKGROUND

In the semiconductor device manufacturing industry, device manufacturers have managed to transition to more closely toleranced process and materials specifications by relying on process tool manufacturers to design better and/or faster process and hardware configurations. However, as device geometries shrink to the nanometer scale, complexity in manufacturing processes increases, and process and material specifications become more difficult to meet.

A typical process tool used in current semiconductor manufacturing can be described by a set of several thousand process variables. The variables are generally related to physical parameters of the manufacturing process and/or tools used in the manufacturing process. In some cases, of these several thousand variables, several hundred variables will be dynamic (e.g., changing in time during the manufacturing process or between manufacturing processes). The dynamic variables, for example, gas flow, gas pressure, delivered power, current, voltage, and temperature can all change based on, for example, a specific processing recipe, the particular step or series of steps in the overall sequence of processing steps, errors and faults that occur during the manufacturing process, or changes in parameter values based on use of a particular tool or chamber (e.g., referred to as "drift").

One way to monitor the manufacturing process is to specify a set of output values that defines the ideal values of parameters occurring during the manufacturing process. The actual output values of the manufacturing process are then compared to the ideal output values to determine if the actual output values are consistent with the ideal output values. This comparison is often performed manually by a process engineer to determine whether the particular output (e.g., processed semiconductor wafers) have desirable properties.

Generally, the process engineer specifies time trajectories of important process variables of the process tool that will be used during the processing. The specification of time trajectories is typically based on inspection of batches by the process engineer and a determination of acceptable time trajectories of variable values based on the output of the process tool and the experience of the process engineer. After a particular process tool undergoes preventive or periodic maintenance or after the passage of time, the values for acceptable variables can change. Such changes generally involve the process engineer manually re-specifying the acceptable time trajectories of process variables for the particular tool, e.g., to re-create or re-enter the specification.

Creating a specification in this manner is a lengthy and labor-intensive process, sometimes taking up to 20 hours or more. Additionally, this creation calls upon the expertise or experience of a process engineer, which can lead to a certain percentage of process faults based on human error or inconsistency in acceptable parameters between maintenance operations. Moreover, updating a specification, as part of a periodic maintenance plan and/or in response to changes within the particular process tool, involves a similar labor-intensive process. Updating the specification takes approximately the same amount of time and effort as creating a specification for the first time.

SUMMARY

There is a need for faster and more consistent creation of time-trajectory specifications including formal statistical batch process models for use in manufacturing processes and for monitoring manufacturing processes and detecting faults in manufacturing processes. There is a further need to reduce the amount of manual input required from human personnel, such as a process engineer, in creating and updating specifications and models. As used herein, "create," "build," or "generate" and variants thereof are used interchangeably. Additionally, "dynamic profiles," "time trajectories," "specifications," and "models," and variants thereof are used interchangeably. "Variables" and "parameters" are also used interchangeably.

The technology described herein relates to a process and system for automated model creation. The technology reduces the time associated with creating a model for use in manufacturing processes (e.g., monitoring and/or fault detection). The technology further reduces over time the involvement required by a process engineer. The technology further improves the consistency of created models, for example, by relying on statistical multivariate methods rather than human ingenuity. The technology relates to systems and methods for generating, building, or creating models using statistical analysis and/or mathematical principles. Data from a manufacturing process are used in a statistical analysis to trigger a template to generate or update a model.

The technology relates to, in one aspect, a method for creating or generating a new model of a manufacturing process according to a multivariate analysis. The method involves selecting a set of data representative of multidimensional data measured during a step or phase of a manufacturing process. The method involves determining a set of model generation conditions based on the set of data and generating the new model, which specifies intervals (e.g., acceptable intervals) for the multidimensional data measured during a future manufacturing process, based on the set of model generation conditions.

In some embodiments, the method involves associating a set identifier or batch ID with the set of data and a step identifier or phase ID with the step of the manufacturing process during which the multidimensional data was measured. The method also involves associating a time variable or maturity variable with the set of data. The method can involve excluding data not to be used during generation of the new model, such as, for example, when the excluded data exceed threshold parameters based on statistical calculations. Statistical calculations sometimes involve at least one of a multivariate principal component analysis or partial least squares analysis (e.g., a Hotelling $T^2$-type calculation, a DModX calculation or a combination thereof). Excluding data can involve removing outliers from the set of data before the new model is generated. In some embodiments, the set of data includes raw data from one or more tools or data from an existing model.

The selecting step can involve importing raw data from one or more process tools or importing data from a previously-generated model. The imported data, in some examples, are scaled and centered based on a unit variance or other statistical calculation. Furthermore, the imported data can be adjusted according to a user-specified set of scaling and centering values before the new model is generated. Examples of model generation conditions feature included variables, excluded variables, included process steps, excluded process steps, maturity variables, time variables, or any combination of these variables. Maturity variables can be smoothed or linearized, and/or time variables can be normalized.

The method involves, in some implementations, triggering generation of the new model when the measured multidimensional data satisfies a threshold condition. The threshold condition can be satisfied when a multivariate analysis of the multidimensional data results in a value that exceeds a threshold value. Examples of suitable multivariate analyses include a Hotelling $T^2$-type calculation, a DModX-type calculation, a weighted moving average-type calculation, or a multivariate control chart calculation, any of which can be derived from a principal component analysis or a partial least squares analysis.

In another aspect, the technology relates to a system for generating data structures indicative of conditions of a manufacturing process or current quality of output of a manufacturing process. The system includes a data supply module for communication with a set of manufacturing tools used for the manufacturing process and for communication with a memory that includes one or more previously-generated data structures. The system includes a data management module in communication with the data supply module. The data management module receives data about the manufacturing process from the data supply module and filters or scales the received data. The system includes a model generation module in communication with the data management module or data supply module. The model generation module generates a model that includes a set of data associated with the manufacturing process based on the data and a set of user-specified conditions.

The system also includes, in some examples, a model specification module that is in communication with the model generation module and a user interface. The model specification module is responsive to user-generated specifications for generating the model. Some implementations feature an outlier removal module in communication with the model generation module and a user interface. The outlier removal module is responsive to user-selected specifications for removing outlier data from the model.

In yet another aspect, the technology features a system for creating or updating a model according to a multivariate analysis. The system includes a user interface. The user interface includes a first window that allows a user to select raw data or data from a previously-generated model to be used to generate a new model. The user interface includes a second window that allows a user to determine model generation specifications. The model generation specifications specify data to be included in the generated model and data to be excluded from the generated model. The user interface includes an area for displaying the data to be used to generate the model. The user interface includes a user-responsive command portion to provide an instruction to a model generation module upon selection by the user, for generating the model. The system also includes a memory for storing the generated model.

The system, in some embodiments, includes a third window that has a user-configurable spreadsheet portion. The spreadsheet portion specifies scaling, centering, or pre-processing values, procedures, or transformations to apply to the data before the model is generated.

Generally, a model is used to specify the ideal values of parameters of a manufacturing process and also used to define a template. The values of the parameters can be considered input data. During the manufacturing process, output data are measured and compared to the input data from the model. Output data are measured by monitoring the process variables of the manufacturing process. The output data can be compared to the input data using statistical analysis, for example, a multivariate analysis. Examples of multivariate analysis include principal component analysis ("PCA") and partial least squares-type ("PLS") calculations, including Hotelling $T^2$ calculations, DModX-type calculations, weighted moving average-type calculations (such as an exponentially weighted moving average), other multivariate control chart calculations, or any combination of these. If the combined results of the statistical analysis exceed a user-defined threshold (or satisfy a user-defined condition), a new model is created or the existing model is updated using a model template and output data (e.g., data from a particular process tool or from a particular manufacturing process). In some embodiments, a model for a particular process tool can be generated from a template previously generated for the same process tool. In some embodiments, a model for a particular process tool can be generated from a template previously generated from a different process tool, but, for example, of the same type of tool for which the new model will be used.

In some embodiments, the technology employs computer software and hardware to implement the processes and systems described herein. The technology also includes one or more user interfaces that allow a user to specify values for various parameters used by the system for the manufacturing process.

BRIEF DESCRIPTION OF THE DRAWINGS

FIG. 2A is a flow chart depicting a method that embodies the technology.

FIG. 2B is a flow chart depicting a method for processing data for generating a model according to an embodiment of the technology.

FIGS. 4A-4G are screen shots that illustrate an exemplary user interface and process for specifying data to be used in building a model, including data to import into the model and data to exclude from the model.

FIGS. 6A-6C are screen shots that illustrate an exemplary user interface and process for importing scaling values of variables.

FIGS. 7A-7D are screen shots that illustrate an exemplary user interface and process for generating a model, including a batch model.

DETAILED DESCRIPTION

Figure 1:
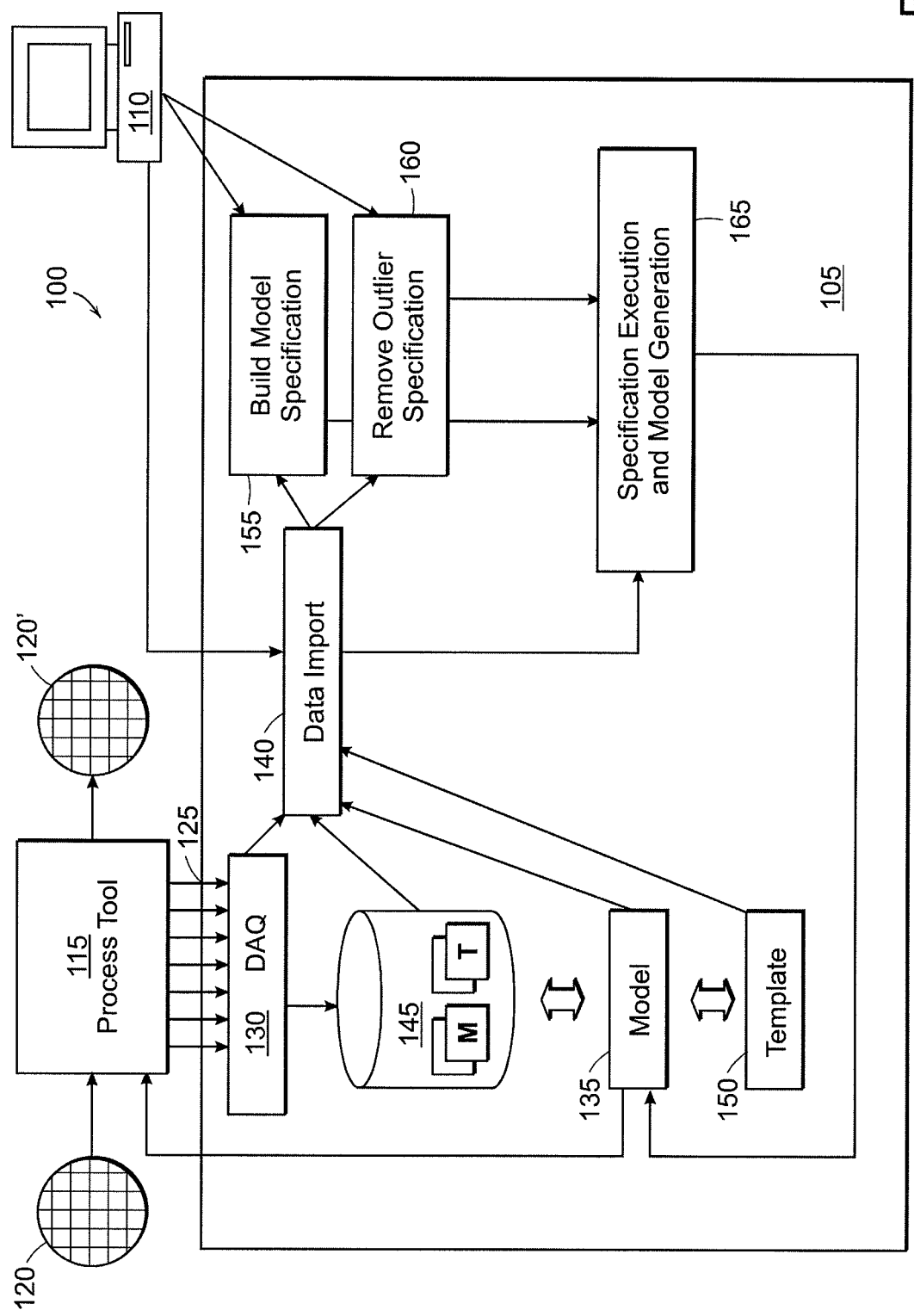
FIG. 1 is a plan view of an exemplary system that embodies the technology.

FIG. 1 depicts an exemplary system 100 that includes a processor 105 and a user interface 110. The user interface 110 can include a computer keyboard, mouse, other haptic interfaces, a graphical user interface, voice input, or other input/output channel for a user to communicate with the processor 105 in response to stimuli from the processor 105. The user interface 110 can include a display such as a computer monitor. The processor 105 is coupled to a processing facility 115. The processing facility 115 performs manufacturing operations for performing wafer processing functions on wafer 120 and outputting a processed wafer 120'. The processing facility 115 can include tools or processes (not shown) for, for example, cleaning wafers, depositing material on wafers, removing material from wafer surfaces, and performing other functions within the processing facility 115.

In some embodiments, the tools or processes include multiple stations or units within the facility 115. These functions can be associated with a plurality of physical parameters, for example, gas pressure, gas flow rate, temperature, time, and/or plasma concentration among many others. In some embodiments, the parameter is the yield loss of the particular wafer 120 that occurs after processing. The physical parameters can be monitored and manipulated to produce a plurality of outputs 125 containing data about the variables (e.g., the physical parameters and/or tool operating conditions) in the processing facility 115. The outputs 125 can be electrical, optical, magnetic, acoustic, or other signals capable of transmitting the data or being transmitted to or within the processor 105. Although the system 100 is described in the context of processing the wafer 120, it will be understood that other manufacturing processes (and batch manufacturing) are contemplated and within the scope and spirit of the technology, for example, manufacturing processes within the biotechnology or pharmaceutical industries.

The processing facility 115 is coupled to the processor 105 by a data acquisition module 130. The data acquisition module 130 receives the outputs 125 from the processing facility 115. In some embodiments, the data acquisition module 130 performs buffering, multiplexing, signaling, switching, routing, formatting, and other functions on the data to put the data in a format or condition for suitable communication or retransmission to other modules of the processor 105.

The particular processes that occur within the processing facility 115 can be monitored or controlled by the processor 105 via a model 135. In some embodiments, the model 135 is associated with various process parameters within the processing facility 115, and the model 135 specifies values or intervals for these process parameters. The values of the process parameters can vary depending on several factors, for example, the order and type of processes occurring in the processing facility 115 or the particular recipe used to process the wafer 120. The model 135 monitors or controls the processing facility 115 by comparing the ideal values of the model with the values used by processing tools within the facility 115 or the facility 115 itself during wafer processing. The actual values of the processing parameters within the processing facility 115 are measured by and/or communicated to the data acquisition module 130 by the plurality of outputs 125.

The system 100 includes a data import module 140. The data import module 140 can accept data from one or more sources including the data acquisition module 130, the model 135, a memory 145, or from a template 150. In some embodiments, the memory 145 includes previously stored models M and/or previously stored templates T. Data can be communicated to the data import module 140 in a variety of formats. In some embodiments, the data can be stored as an XML file or in XML format. The model 135 or the template 150 can be XML files. As used herein, the model 135 and template 150 refer to the particular file or data repository containing parameters of a manufacturing process and/or the underlying data indicative of the physical parameters associated with a manufacturing process.

The data import module 140 can be a software "wizard" in communication with the user interface 110. A user can select a model (e.g., the model 135) via the user interface 110, and the data import module 140 will retrieve the model file from the memory 145. The model 135 file includes parameters representative of physical parameters that were measured and/or acquired during a manufacturing process in the processing facility 115.

The user can associate an identifier with the data used in model 135 that specifies the particular wafer that the data correspond to. The identifier can be referred to as a set identifier, a wafer ID or a batch ID, and are used interchangeably herein. The user can also associate an identifier with the data used in model 135 that specifies the particular step in the manufacturing process that the data correspond to. This identifier can be referred to as a step identifier, process identifier, or phase ID, and are used interchangeably herein. The user, via the data import module 140, can associate a validity time, time variable, or maturity variable with the data used in model 135.

The system 100 also includes a build model specification module 155 in communication with the user interface 110. The build model specification module 155 permits the user to establish conditions or criteria to be used in generating a model. These conditions and criteria include, for example, variables to include or exclude, processes to include or exclude, maturity variables, time variables, or other factors used to generate a model for future manufacturing processes. The system also includes a remove outlier specification module 160. The remove outlier specification module 160 allows the user to inspect the data associated with a model or to be used to generate a model and select particular data points (e.g., outliers) to be excluded from generation of a new model. The build model specification module 155 and the remove outlier specification module 160 can be dialog-based interfaces to the user interface 110 by which the user can set particular conditions and criteria or choose particular data to exclude when building a model. The build model specification module 155 and the remove outlier specification module 160 can convert the user conditions and outliers into parameters or rules to be used in generating a model by a specification execution and model generation module 165 (hereafter, "model generation module 165").

The model generation module 165 uses data from the data import module 140, the build model specification module 155, and the remove outlier specification module 160 to generate a new model, for example, the model 135 based on the imported data, the user-specified conditions or parameters, and the outliers to be excluded from the model. After a model 135 has been generated, the model 135 can be stored as a template 150 in the memory 145 as a template T. In some embodiments, the model 135 is not stored as a template 150 and is stored in the memory 145 as a model M.

The model generation module 165 specifies the values or intervals of each of the process parameters or variables to be used to monitor the processing facility 115. The model 135 can be saved in a memory 145 within the processor 105 with a plurality of other models M or templates T. In such embodiments, creation of a new model (not shown) or updating an existing model 135 involves the user manually re-specifying the new or updated values for the process parameters or variables. An advantage realized by the technology described herein is that after a model 135 has been stored in the memory 145, the model 135 can be subsequently used and/or modified automatically based on a statistical analysis of data acquired during manufacturing. This reduces the amount of labor and expertise required by a process engineer to generate a model by hand.

The template 150 includes information about the model 135, such as the process parameters to be used in the processing facility 115 and the values for each of the process parameters. The template 150 can be generated by a command received from the user interface 110 based on the model 135. A template-generating module (not shown) generates the template 150 based on the model 135 and/or based on data from the data acquisition module 130. For example, the user can select one or more wafers 120' with desirable properties after processing, and the values of process parameters communicated by the plurality of outputs 125 during the processing of such wafers is used to generate the template 150. This allows the model 135 to incorporate data from previously-processed wafers, for example, conditions within a tool or chamber in the processing facility 115, previous processes or recipes, or results of measurement (e.g., metrology). In some embodiments, the model 135 incorporates this information implicitly through previous wafer data to generate the new model. In some embodiments, information about previous processing can be specified by the user. In some embodiments, the template 150 is selected from a set of previously-defined templates (not shown) via the user interface 110. The previously-defined templates can be stored in the memory 145 or in a different database (not shown).

In some embodiments, the data import module 140, build model specification module 155, remove outlier specification module 160, and the model generation module 165 are included in a single software program, such as the "Project Builder" module based on the SIMCA®QP+ multivariate prediction software application from Umetrics, Inc. of Umea Sweden. The "Project Builder" module is a utility that can be used to build models that are compatible with the SIMCA®P+ software application, e.g., versions 11.5 and later. SIMCA®P+ refers to a batch analysis application that involves multivariate statistical analysis and is sold by Umetrics, Inc. of Umea, Sweden. The "Project Builder" module can build "batch models" that are suitable for monitoring the particular process parameters used in a manufacturing process, e.g., to replicate a previously-processed wafer or to specify the values used by various processing tools. In some embodiments, the "Project Builder" utility is a dedicated tool for generation of models and templates for one or more Umetrics products.

Although the technology is described in portions herein relating to a batch-type process (e.g., semiconductor wafer processing, pharmaceutical dose processing or biotechnology sequencing or processing), it will be understood that the processing and analysis techniques can also be applied to continuous-type processes, for example, pipeline flow, refinery processes, or other processes without well-defined start/stop times and/or events.

FIG. 2A is a flow chart 200 depicting a method that embodies the technology. The method involves selecting or importing data associated with a manufacturing process (Step 205). The data can be included in a set of data representative of physical parameters of various process tools or measured outputs of various process tools (e.g., static and/or dynamic variables) during a manufacturing process (e.g., multidimensional data having intervals of acceptable values). The data can also be representative of the values of physical parameters measured during a particular processing or recipe step. The data can be selected from a preexisting model or template from a memory (e.g., the memory 145 of FIG. 1) or based on raw data (e.g., a data set acquired from a particular tool or during a particular processing step). The data can be selected or imported in the form of an XML file or other suitable file formats.

The method also involves a determination of whether to exclude certain data from the generation of the new model (step 210), for example, particular variables to be excluded or particular process steps to be excluded. When data will be excluded from the model generation, the user selects which data to exclude (e.g., outliers or data about tools or processes that will not be used in the generation of the new model) (step 215). When data selected or imported will not be excluded, the method involves determining model generation conditions (step 220). Model generation conditions are used to specify the values for the particular parameters in the generated model.

After the data have been imported and the model generation conditions specified or determined, a model generation process is implemented (step 225). The model generation process generates a new model based on the imported data and the generation conditions. The new model can be used in future manufacturing processes to specify particular values of variables in a processing facility. After the model has been generated, the method involves a determination of whether the model will be used as a template (step 230) for future models. When the model will be used as a template, a template is created from the model (step 235). The template and/or the model can be stored in a memory. When the model will not be used as a template, the model is stored in a memory (step 240).

FIG. 2B is a flow chart 260 depicting a method for processing data for generating a model according to an embodiment of the technology. The method involves selecting raw data or importing data from a previously-stored model (e.g., step 205 of FIG. 2A). A set identifier is assigned to the data (step 265). The set identifier can be a batch ID that specifies or identifies a particular previously-processed batch or a particular processing tool. The method also involves assigning a step identifier to the data (step 270). The step identifier can be a phase ID that specifies or identifies a particular processing step, carried out by a particular process tool. The method involves assigning a time variable or a maturity variable to the data (step 275).

The method also involves scaling the data (step. 280). In some embodiments, the scaling is selected to provide the scaled data matrix with column-wise unit variance before the statistical analysis of the data is made to provide the model. Alternatively, the user can specify a scaling to apply to the data prior to generating the model where a scaling file is used to specify particular values of the data that are suitable based. Scaling is discussed in more detail below with respect to FIG. 6. The method depicted in FIG. 2B can be implemented immediately after step 205 in FIG. 2A (e.g., before step 210 occurs) or later in the process of FIG. 2A. In some embodiments, any of step 265, step 270, or step 275 are optional. For example, after raw data or a previously-stored model is selected (step 205), the data can be scaled (step 280). In some embodiments, some but not all of step 265, step 270, and step 275 are optional.

In some embodiments, the technology is implemented in software. In such embodiments, the technology includes a user interface that allows the user to initiate the technology, configure various parameters (e.g., specify suitable values of adjustable parameters in the software, select options including where to save the resulting model and how to assign a filename), initialize data acquisition and reading (e.g., either raw data or from existing model files), and/or specify additional information used by the technology to create a model that corresponds to the user's objectives. The following description in FIGS. 3A-8, inclusive, describes an illustrative user interface that can be used with the technology. The following illustrative description is exemplary, and changes to the user interface will be apparent to one of skill without modifying or changing the underlying operation of the technology.

Figures 3A, 3B:
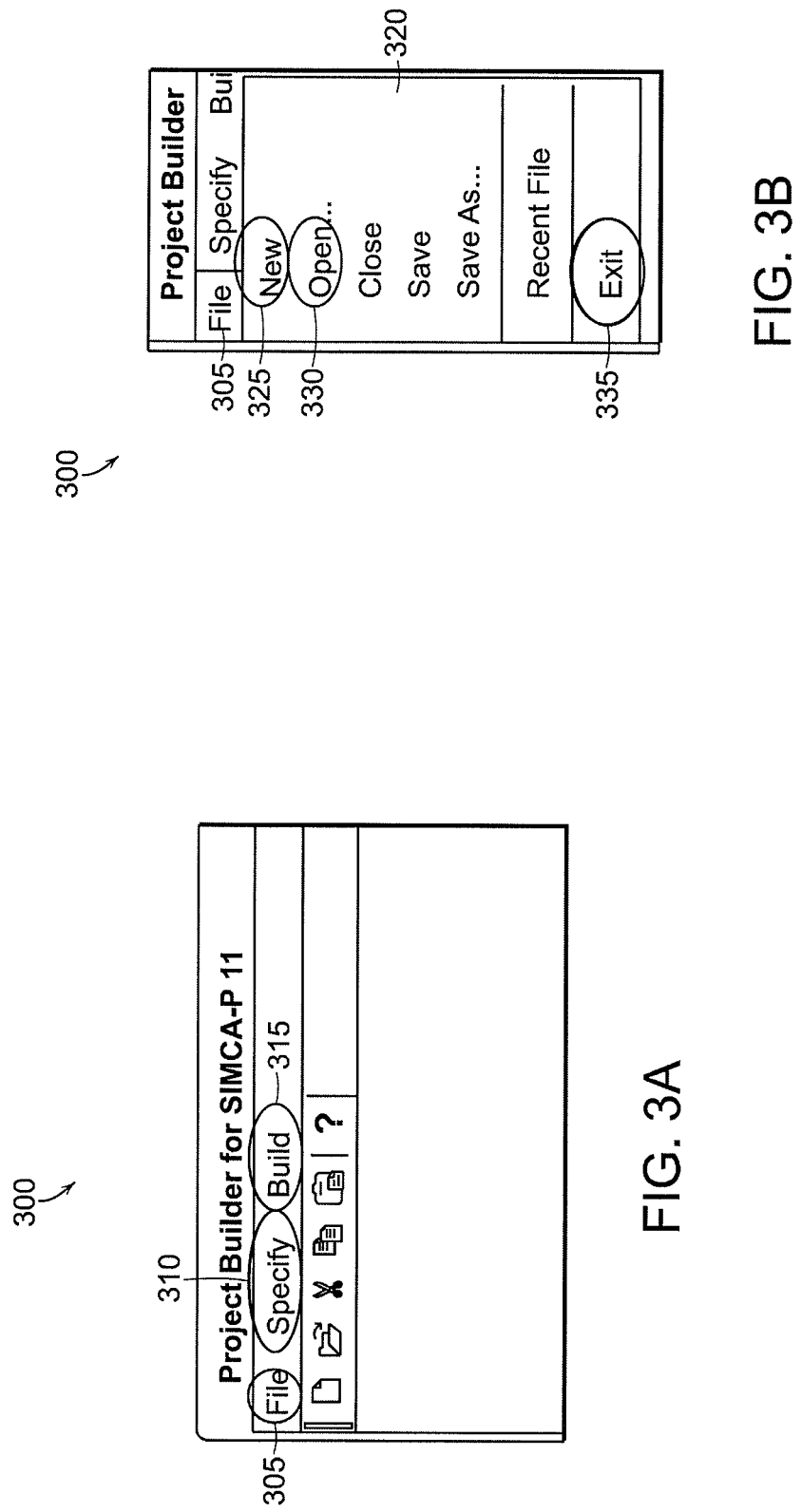
FIGS. 3A-3B are screen shots that illustrate an exemplary user interface of a project builder or generator module.

FIGS. 3A-3B are screen shots that illustrate an exemplary user interface of a project builder or generator module.

FIG. 3A illustrates a user interface window 300 that can be used to facilitate implementation of the technology. In some embodiments, the user interface window is a utility or part of a software application, for example, the SIMCA®P+ program sold by Umetrics, Inc. of Umea, Sweden. The user interface window 300 includes a "File" button 305, a "Specify" button 310, and a "Build" button 315, each of which triggers or opens a drop-down menu (not shown) of options for a user's selection.

FIG. 3B illustrates the user interface window 300 of FIG. 3A after the user selects "File" button 305. A menu 320 appears in response to the user selecting the "File" button 305. The menu 320 allows the user to create a "New" project using the "New" button 325, to open an existing project using the "Open . . . " button 330, or exit the utility using the "Exit" button 335.

FIGS. 4A-4G are screen shots that illustrate an exemplary user interface and process for specifying data to be used in building a model, including data to import into the model and data to exclude from the model. The processes depicted in FIGS. 4A-4G occur in response to a user selecting the "New" button 325 in the menu 320 of the user interface window 300 of FIG. 3B. The process depicted by FIGS. 4A-4G allows the user to generate a new model based on raw data (e.g., when an existing model does not exist and/or a suitable template does not exist). In some embodiments, the user interface includes a sequence of windows, each addressing one set of parameters or options to organize input and logically guide the development of model parameters. The illustrative user interface includes menus and commands. In some embodiments, the menus and commands are organized in the form of a "Wizard" that guides the user, step-by-step and/or window-by-window, through the data importation process.

Figure 4A:
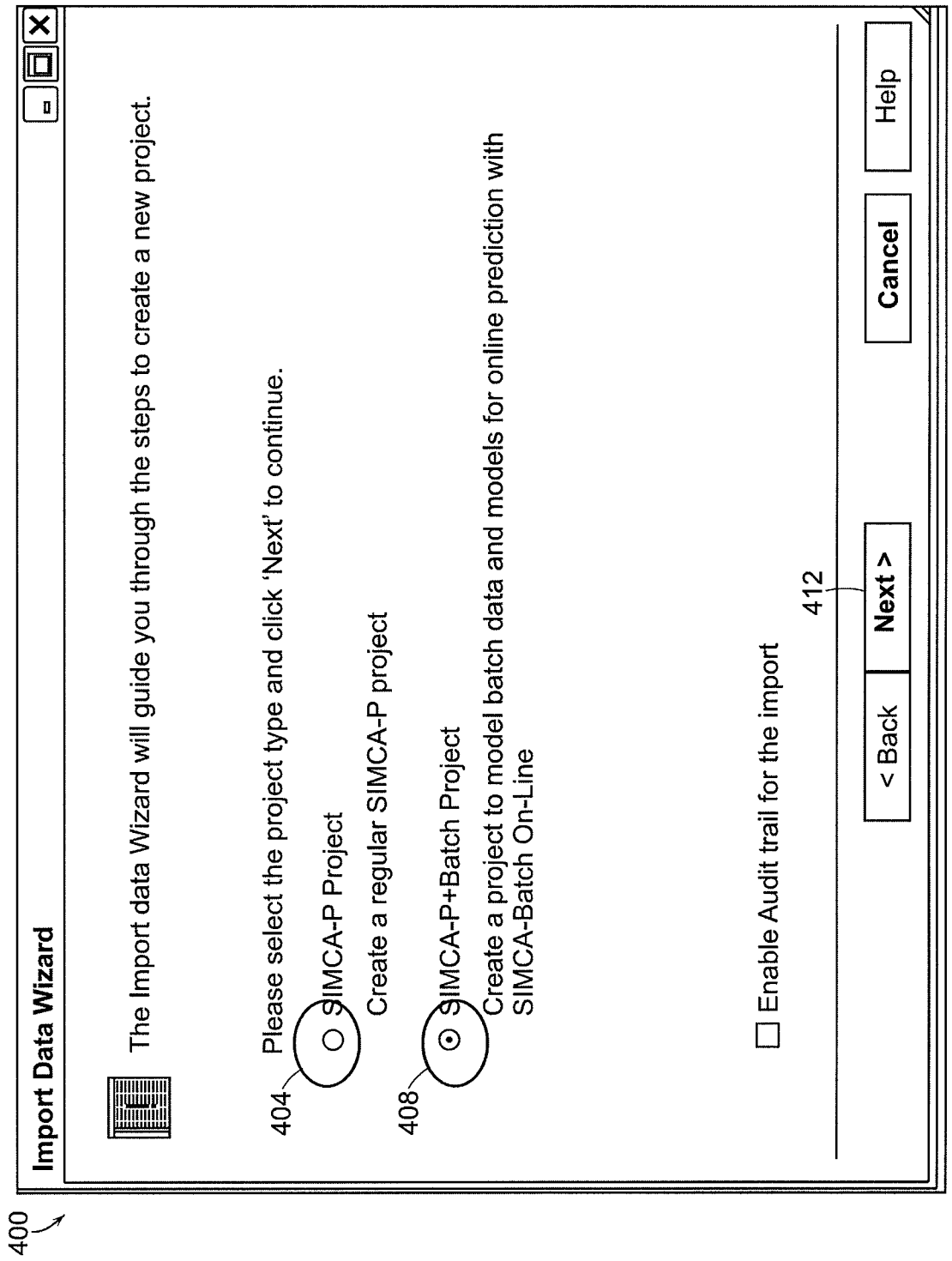

FIG. 4A illustrates an exemplary user interface window 400 called the "Import Data Wizard" that allows a user to select data to be used in generating a model. After a user has selected a data set for generating a model, the user interface window 400 appears. The user interface window includes a "SIMCA-P Project" radio button 404 and a "SIMCA-P+ Batch Project" radio button 408. The user selects the "SIMCA-P Project" radio button 405 to generate a regular SIMCA-P project for a continuous process. The user selects the "SIMCA-P+ Project" radio button 410 to create a project that generates a model associated with batch data. The batch model can be used for monitoring and predictions of manufacturing processes, for example, as used by SIMCA-Batch-On-Line, sold by Umetrics, Inc. of Umea, Sweden.

After the type of project has been determined, the user clicks the "Next" button 412 of the user interface window 400, and the user interface window 416 of FIG. 4B appears. The user interface window 416 includes a spreadsheet portion 420 that includes all of the data from the particular model that was selected or all of the data from the particular data set that was selected. The spreadsheet portion 420 includes columns specifying a "Batch ID" 424, a "Phase ID" 428, a variable ID 432, an "Interval" 436, and a "Time" 440. The data in the spreadsheet portion are manipulable and configurable to the particular model that the user wants to create. Other ways to organize the data in the interface 416 (e.g., other than a spreadsheet) are also within the scope of the technology and apparent to one of skill.

The "Batch ID" column 424 allows a user to select a particular wafer at a particular point in time and use the data measured about the wafer at that time as part of the generation of the model. The data can include data representative of the input parameters of the process tools or the output parameters measured during processing (or both). For example, the data can include the desired values for the physical parameters as well as the actual values for those parameters. In some embodiments, the data includes a comparison of the desired value and the actual values. This information can be used to determine a fault in a processing facility and can be used to identify and/or remove outliers from a generated model.

The "Phase ID" column 428 allows a user to select a particular process step associated with a particular wafer. The data about the process step are also used as part of the data to generate a model. The "Interval" column 436 allows the user to specify, select, or identify a sampling interval over which the data is collected. The "Time" column 440 allows the user to identify the time during which the particular sampling interval in the adjacent "Interval" column 436 occurred. The time and sampling interval can be associated with the wafer, "Batch ID" column 424 and/or the processing step, "Phase ID" column 428.

The spreadsheet portion 420 can also include additional columns 448 that specify the particular process tool from which data have been collected. These columns allow the user to specify the particular tools about which data are desired, in addition to data about the batch and the processing steps. In some embodiments, data about some process tools are unnecessary for the current model that the user desires to generate, for example, when the data used to generate the model include a recipe, processing steps, or tools not used in the process, tools, or wafers to which the model will be applied. The user can select particular process tools or chambers to include and/or exclude from the model. This process is depicted in FIG. 4C.

Figure 4C:
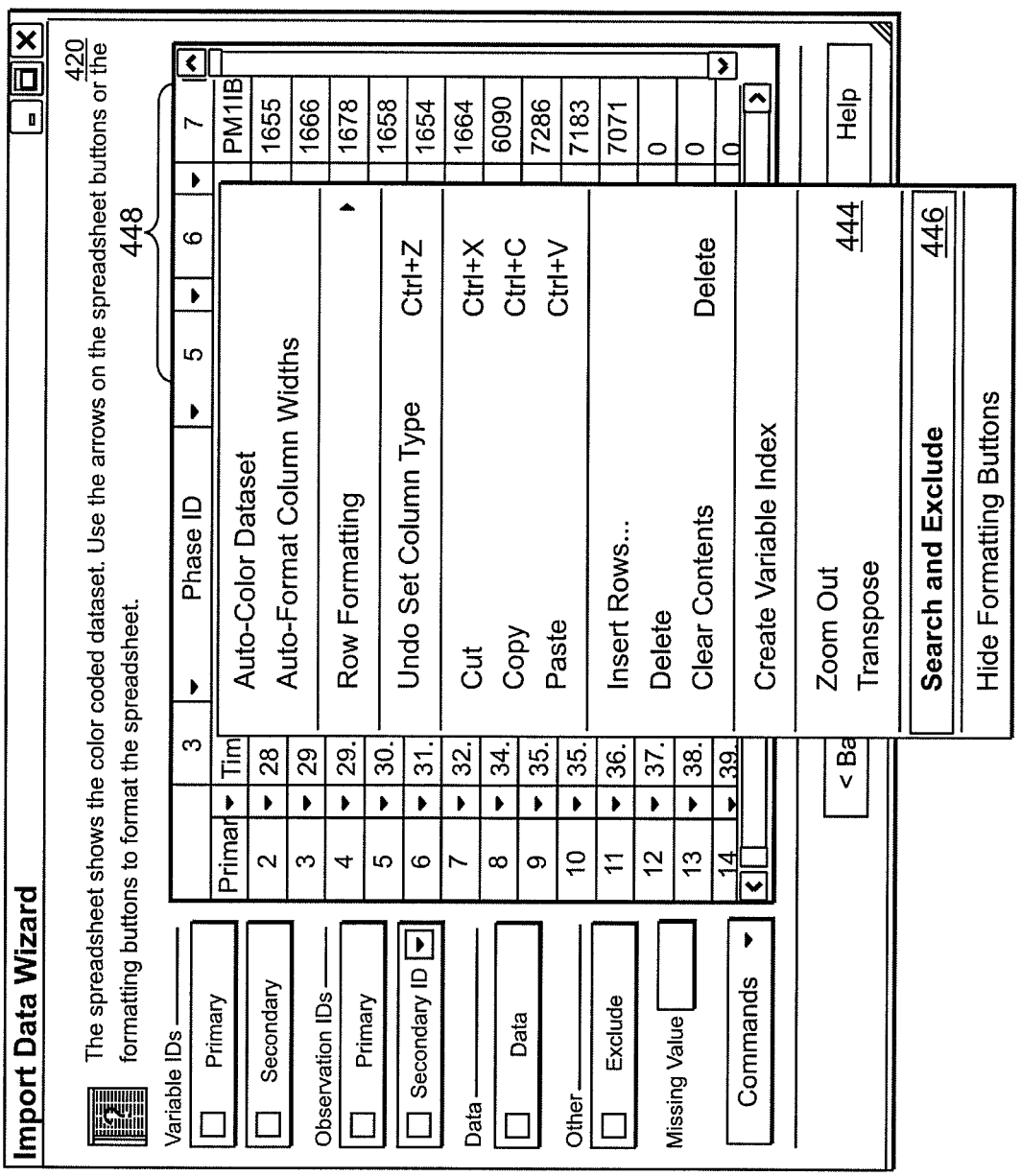

For example, in FIG. 4C, the user can identify the particular cell in the spreadsheet portion 420 of user interface window 416 corresponding to a tool or tools whose data is to be excluded from the model. The user can issue a "search and exclude" command, e.g., by a right-click on a mouse input and dragging to the "Search and Exclude" option 446 in the menu 444 that appears in response to the right-click. Upon the user selecting the "Search and Exclude" option 446, the "Search and Exclude" window 452 of FIG. 4D appears.

Figure 4D:
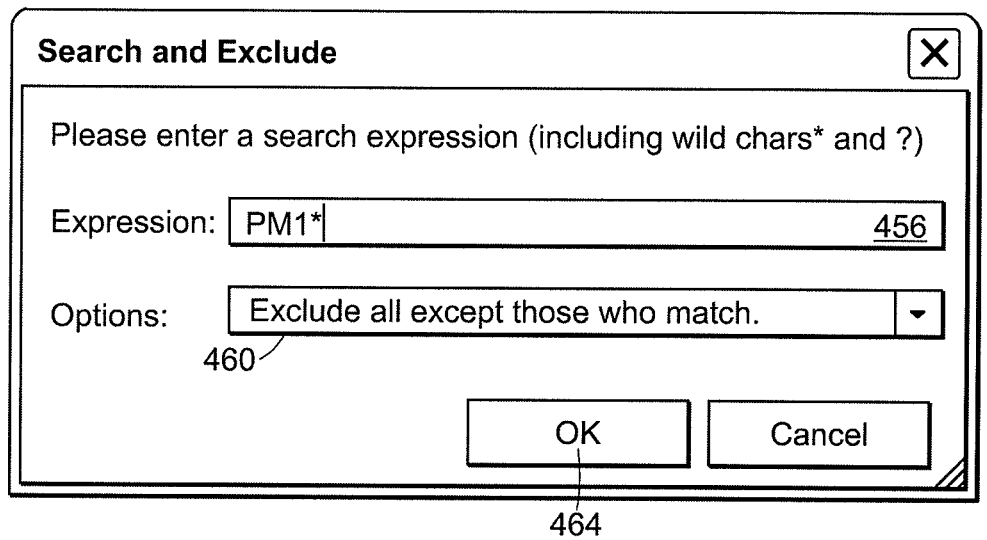

The "Search and Exclude" window 452 includes an "Expression" field 456 and an "Options" field 460. The "Expression" field 456 is a free-form, text-fillable field that allows the user to specify particular processing tools or chambers. Each processing tool or chamber in a manufacturing facility is associated with an identifier. The particular identifier of a processing tool or chamber can be entered in the "Expression" field 456. In some embodiments, a user can identify multiple tools or chambers within a single facility or sub-facility in the "Expression" field 456 using a wild-card character, such as an asterisk (*) or exclamation point (!) characters on the user's keyboard. The wild-card character allows the user to specify all processing tools or chambers that have common identifiers. For example, the "Expression" field 456 in FIG. 4D is filled with "PM1*" text. As a result, all processing tools or chambers that include "PM1" as the beginning of an identifier will be returned by a search and affected by the particular "Option" selected in the "Options" field 460. The inputs for the "Options" field 460 can be selected through a drop-down menu as indicated in the "Search and Exclude" window 452, or through other techniques suitable for determining how the information in the "Expressions" field 456 is used.

The "Options" field 460 in FIG. 4D indicates "Exclude all except those who match." This setting results in a search on the data set represented in the spreadsheet portion 420 of the user interface window 416 and would exclude data from processing tools or chambers that do not include the indication in the "Expression" field 456, e.g., processing tools or chambers that include "PM1" as the beginning of an identifier. Other examples of entries for the "Options" field 460 include "Include only those who match," "Exclude those who match," or "Include all except those who match." Other options can be used to determine which data from which processing tools or chambers is used to generate the model. After the data to be excluded from the model have been specified in the "Search and Exclude" window 452, the user selects the "OK" button 464, and the excluded data are not used to generate the model.

In some embodiments, for a particular batch, one or more processes or processing tools may have been restarted in response to processing conditions. When processing steps are restarted, some of the data points associated with a particular Phase ID may be nonconsecutive. The user is notified (e.g., by a prompt) that the particular process steps or phases are out of order. The user is also requested to manipulate the Phase IDs until the steps or phases are consecutive. For example, the user can be shown the following message "The observations (e.g., data points sampled during a sampling interval) in a phase (e.g., a processing step) should be consecutive within every batch (e.g., wafer) and all phases should have a unique ID." Upon receiving the prompt, the user indicates that certain phases will be excluded, for example, by a right-click on a mouse input in the spreadsheet portion 420 of the user interface window 416 of FIG. 4B, which interfaces to a menu that allows the user to exclude particular phases or process steps.

Figure 4E:
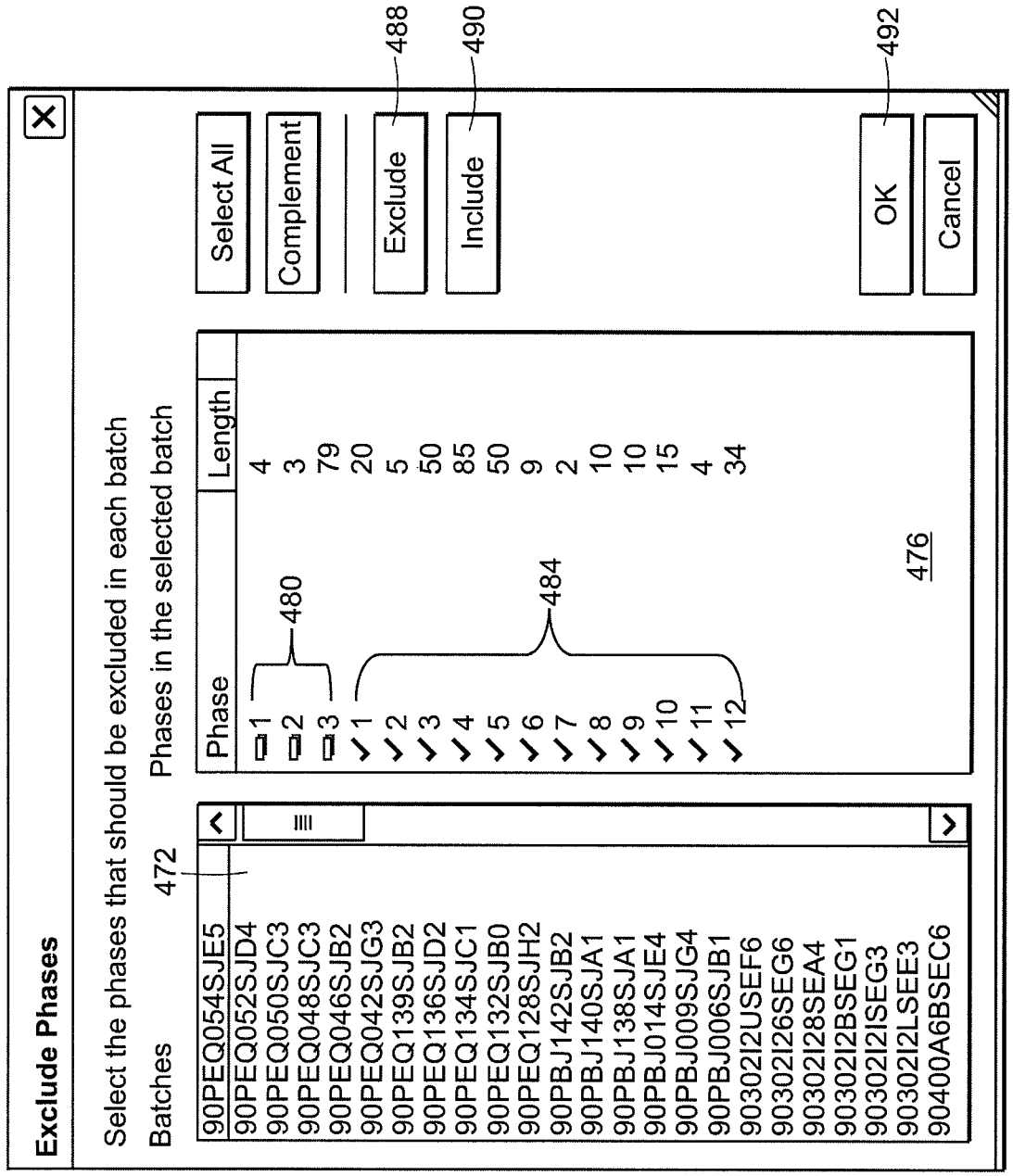

FIG. 4E illustrates a user interface window 468 called "Exclude Phases" that allows a user to exclude data collected during particular processing steps or phases of particular wafers or batches from model generation. For example, the user interface window 468 includes a portion 472 in which wafers or batches are indicated by their identifier (e.g., wafer ID or batch ID). For the selected or highlighted batch, which is named "90PEQ054SJE5," the processing steps or phases used to generate that wafer are displayed in the "Phases" portion 476 of the user interface window 468. As indicated by the minus sign or dash marks in the "Phases" portion 476, steps 1-3 (reference numeral 480) were not completed. As a result, the process steps were restarted with step 1 and continued successfully through step 12 (reference numeral 484). The successful nature of steps 1-12 is indicated by the "check" mark next to each identified step.

As a result of the restarted process, the phases associated with the wafer or batch are nonconsecutive and appear as 1-2-3-1-2-3-4-5-6-7-8-9-10-11-12. When the wafer "90PEQ054SJE5" is highlighted, steps 1-3 are excluded upon the user selecting steps 1-3 (reference numeral 480) and then selecting the "Exclude" button 488. In some embodiments, the user selects steps 1-12 (reference numeral 484) and then selecting the "Include" button 490 to include the data in the model generation. This process is iterated for other wafers or batches in the portion 472 in which processing steps or phases are identified nonconsecutively. The user completes excluding (or including) phase steps by selecting the "OK" button 492 in the user interface window 468. When the user selects the "OK" button 492, the process of retrieving data responsive to the user's specification occurs.

FIGS. 4F and 4G depict, respectively, a user interface window 494a and 494b. The user interface window 494a depicts the included "Phases" based on the user's specification included in generation of a new model. From the user interface window 494a, the user can further modify the data used in model generation, for example, by deleting, merging, or renaming data from included processing steps or phases. For example, the user can delete a phase by highlighting the phase in the data portion 496a and then depressing the "Delete" key on the user's keyboard (not shown). The data portion 496a also includes the validity time (e.g., time variable or maturity time) is also depicted and is associated with each phase or processing step. The data portion 496a also includes the number of data points or "observations" for each processing step or phase in the "Obs/Batch" column 498. The number of "observations" allows the user to exclude (e.g., by deleting) processing steps or phases with a relatively low number of data points, for example, less than three. Processing steps with low numbers of data points are sometimes unreliable and can affect the effectiveness and/or accuracy of the model. The user can also select unwanted processing steps or phases for deletion based on the user's preference and/or experience.

FIG. 4G depicts a user interface window 494b that illustrates the "Batches" or wafers the data from which is used to generate the model. The identified wafers or batches in the data portion 496b are displayed in response to the user's specification (e.g., as discussed above with respect to FIGS. 4A-4D). From the user interface window 494b, the user can further modify the data used in model generation, for example, by deleting batches having outliers compared with the majority of the data. Outliers can be identified, for example, by the user based on experience or other factors or by an automated process (e.g., a statistical calculation applied to the data, including threshold values of variables or model parameters such as Hotelling's $T^2$ or residual standard deviations (denoted here as "DModX" for "Distance to the Model") to define consistent and/or outlier data. The data portion 496b can be sorted in ascending or descending order according to the number of "observations" or data points in the column 499. The user can select batches for deletion based on the number of data points, or for other reasons, such as preference or the user's experience. Data from processing steps deleted in the user interface window 494a are not used to generate the model. In some embodiments, comments about the wafers or batches, e.g., information about missing steps or outlier data, are depicted in the data portion 496b of the user interface window 494b.

Other data manipulation tools are available to the user in the user interface window 494b, for example, importing local data centers or conditional deletion of batches upon the user selecting the "Import Local Centering" button 495 or the "Conditional Delete" button 497. Additional user interface windows and processes are available for specifying generated variables to be used together with selected original variables in building a model, including the scaling of the generated variables.

Figure 5A:
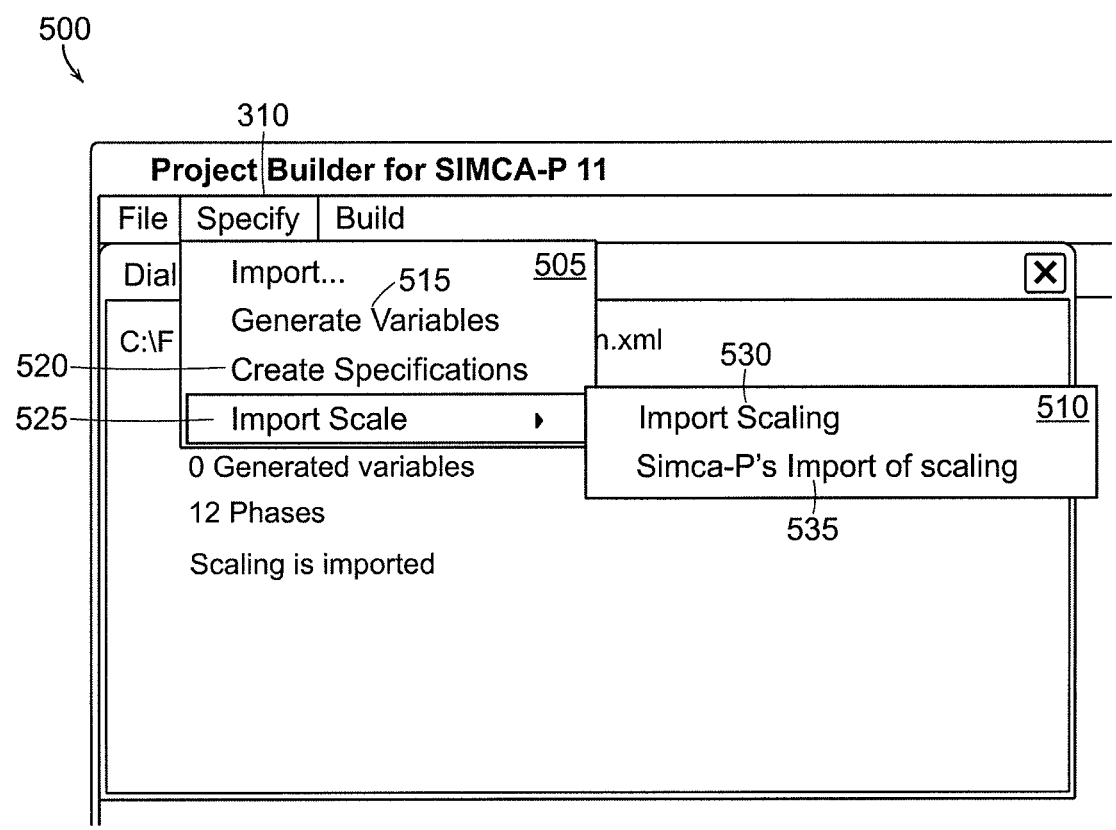
FIGS. 5A-5C are screen shots that illustrate an exemplary user interface and process for specifying data to be used in building a model, including importing scaling values of variables.
Figure 5B:
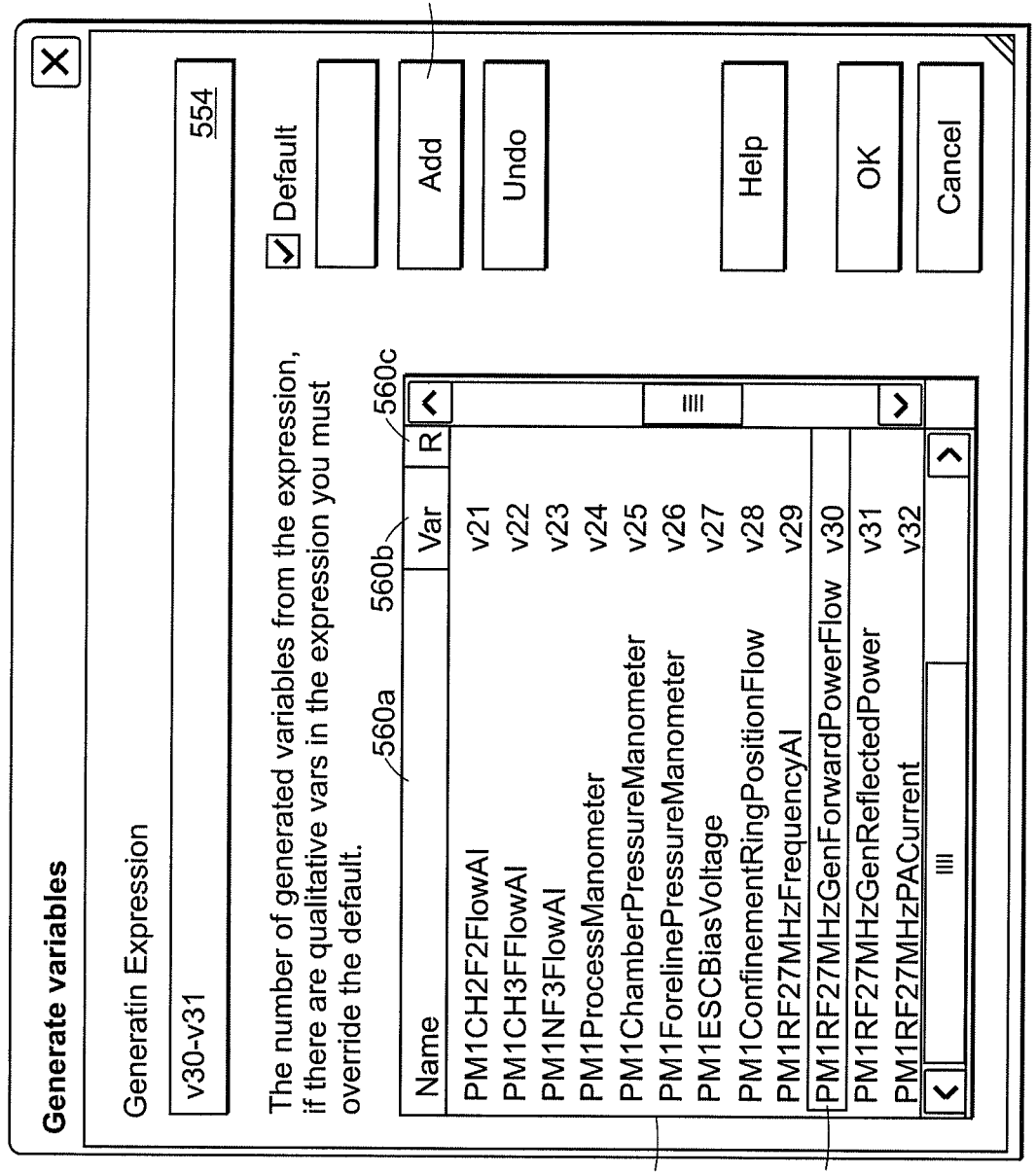
Figure 5C:
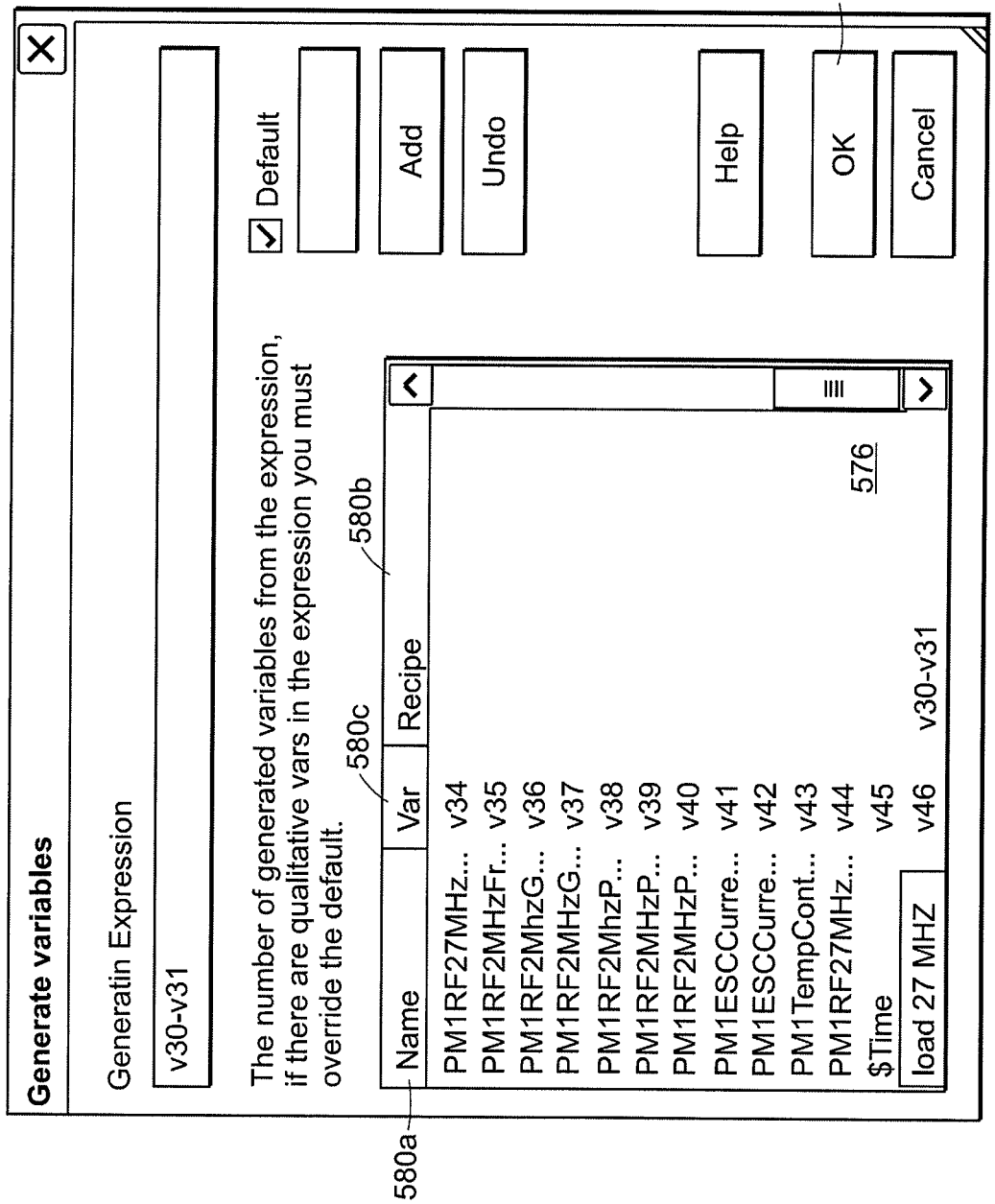

FIGS. 5A-5C are screen shots that illustrate an exemplary user interface and process for specifying data to be used in building a model, including scaling imported values of variables. FIG. 5A illustrates an exemplary user interface window 500. The user interface window 500 is visually similar to the user interface window 300 of FIG. 3A. The user interface window 500 includes a first drop-down menu 505 and a second drop-down menu 510 adjacent to the first drop-down menu 505. The first drop-down menu 505 appears when a user selects the "Specify" button 310. The functions and utilities available through the "Specify" button 310 allow the user to generate an "observation-level" model. To generate an "observation-level" model, the user generates new variables, imports a scaling file, such as an XML file to specify scaling for the variables, configures statistical variables for each processing step or phase, and selects particular steps to include or exclude (e.g., similar to the process discussed above with respect to FIGS. 4A-4G). The user can also use the functions and utilities available through the "Specify" button 310 to provide conditions or specifications for generating a model (e.g., a batch model) and/or to remove outliers.

The first drop-down menu 505 includes a "Generate Variables" selection 515, a "Create Specifications" selection 520, and an "Import Scale" selection 525. Upon the user selecting the "Import Scale" selection 525, the second drop-down menu 510 appears. The second drop-down menu 510 includes an "Import Scaling" selection 530 and a "Simca-P's Import of Scaling" selection 535.

In some embodiments, the user can select outliers to exclude using a multivariate statistical analysis of the selected batch data. For example, the user can perform a principal-component analysis of the data and can calculate t1 and t2 batch-level scores. The user can also use a partial least squares calculation using, for example, Hotelling $T^2$-type statistical calculation or a DModX-type statistical calculation to find outlier data. In some embodiments, the user can communicate with a statistical analysis module (not shown) via a user interface to perform the Hotelling-$T^2$type or DModX-type calculations.

The multivariate analysis module can perform, for example, a Hotelling $T^2$-type calculation or a DModX-type calculation on the batch data to determine if a particular point or a particular batch is an outlier. A Hotelling $T^2$-type calculation can be used to determine a $T^2$ summary value from scores (t) from raw data (X). The Hotelling's $T^2$ is used to summarize the scores at the $i^{th}$ process data point according to the following equation:

$$T_i^2 = \sum_a \left(\frac{t_{ia}}{s_{ta}}\right)^2, \quad \text{Equation 1}$$

where $s_{ta}$ is the standard deviation for the $a^{th}$ score, based on data acquired for previous wafers, and $t_{ia}$ is the value of the $a^{th}$ score at the $i^{th}$ data point.

In general, a $T^2$ value corresponds to the weighted distance of manufacturing process variables, measured along the model (hyper) plane for an output (e.g., the wafer 120' of FIG. 1) of the manufacturing process relative to an output produced under normal process operation. One way to understand the meaning of the $T^2$ value is to consider it in terms of a geometric description. A normal manufacturing process is a cluster of data points in a K-dimensional space, where K is the number of measured manufacturing process variables. A multivariate PC or PLS model defines an A-dimensional hyperplane that approximates this cluster. A $T^2$ value corresponds to the squared distance along the hyperplane of a new output from the center of this cluster of data points relative to the variation output of the variables in the normal process condition—usually taken as the center of the cluster. The acceptable process variation is often illustrated as an A-dimensional hyper-ellipse that bounds the cluster of data points when they are projected down on the model hyperplane. In general, Hotelling $T^2$-type calculations can be used to, for example, determine whether a particular point is an outlier (e.g., outside the hyper-ellipse) with respect to the remainder of the data set. More specifically, a Hotelling $T^2$-type calculation can be used to determine whether a particular measured parameter is outside an alarm limit, as determined by a mathematical model for the process parameters being observed. When a calculated $T^2$ value exceeds a threshold $T^2$ value, the particular data point or batch can be excluded from the generated model if it is part of the model training set (e.g., that data will not be included in the calculations or algorithm that assembles the model data). Alternatively, if the outlying data point is a new data point measured on-line on the manufacturing process, this indicates that the process is misbehaving and some kind of action should be considered.

Another example of a suitable mathematical calculation is a DModX-type calculation. A DModX-type calculation involves calculating the distance of a particular data point from a location in an n-dimensional space that represents a preferred location (e.g., a location associated with an ideal batch). The DModX value is calculated using a principal components analysis or partial least squares analysis that maps a k-dimensional variable to a lower order (e.g., less than order k) dimensional variable. Mathematically, the DModX value is the residual standard deviation for an observation or process point resulting from the analysis. Similarly to the Hotelling $T^2$-type calculation, when the calculated DModX score exceeds a threshold DModX score, the particular data point or batch can be identified as an outlier and excluded from the generated model. In some embodiments, the user configures the $T^2$ and DModX thresholds via a user interface. In some embodiments, both Hotelling $T^2$-type and DModX-type statistical calculations are performed on the data to determine outliers.

In some embodiments, the user interface also allows the user to specify a "Y" variable (not shown) for observation-level batch process models. In some embodiments, the Y variable is a time variable, such as local batch time, or other variable that specifies how long a particular batch has been running. In some embodiments, the Y variable is a maturity variable indicating the degree of completion of a batch (e.g., molecular weight in a polymerization step). The user can optionally smooth the maturity variable by fitting the variable to a curve or a function. In some embodiments, the user does not specify a Y variable for observation-level batch process models. In such embodiments, the technology uses a default Y variable (or a default value for the Y variable). An example of a default Y variable is batch time, which can be linearized and/or normalized.

In some embodiments, the user generates a set of new variables based on or as a function of existing variables. For example, upon the user selecting the "Generate Variables" selection 515 in the first drop-down menu 505 in FIG. 5A, the user interface window 550 of FIG. 5B appears. The user interface window 550 allows the user to specify particular variables (or processing steps) to be used in the generated model. The user interface window 550 includes a text-fillable field 554 and a list 558 of available variables that can be sorted by "Name" 560a or by "Var" (e.g., variable number) 560b or by "Recipe" 560c.

The "Name" 560a identifies the particular physical quantity or parameter that is being measured in the particular processing facility, for example, "Flow," "Process Manometer," "Chamber Pressure," or "Bias Voltage." Each measured physical parameter is associated with a variable number, e.g., as indicated in the "Var" 560b list. For example, "PM1RF27 MHzGenForwardPowerFlow" variable 562 highlighted in the list 558 refers to the chamber (e.g., "PM1"), the tool (e.g., "RF27 MHz, which is a radio-frequency energy generator operating within the 27 MHz frequency range), and the particular measured quantity (e.g., "GenForwardPowerFlow," which is the power load from the generated forward power in the tool). The variable 562 is associated with "v30" as a variable number. The data associated with each "Name" 560*a* is also associated with a particular recipe or series of processing steps, identified in "Recipe" 560*c*.

As illustrated in FIG. 5B, the user selects a particular variable for including in the new model by identifying the "Var" 560*b* or variable number associated with the particular variable in the text-fillable field 554. As illustrated, the text-fillable field identifies "v30-v31," indicating that the user has selected "PM1RF27 MHzGenForwardPowerFlow" and "PM1RF27 MhzGenReflectedPower" for including in the generated model upon the user selecting the "Add" button 564. When the user selects the "Add" button 564, the user interface window changes to 572 of FIG. 5C. The user interface window 572 now includes a list 576 of all variables that the user has added and/or whose data will be included in the generated model. The list 576 includes the variable name 580*a*, the original variable number "Recipe" 580*b*, and the "Var" 580*c* associated with the list 576. For example, the variables from FIG. 5B have been added to the list 576 and have been assigned a new variable, "v46," in "Var" 580*c*. The user can change the "Name" 580*a* of the variable (e.g., rename the particular file containing the data set associated with the variable) in the list 576 according to the user's preference, e.g., the variable name in FIG. 5C has been changed to "load 27 MHZ." Upon the user completing importing variables into the list, the user selects the "OK" button 584.

Figure 6C:
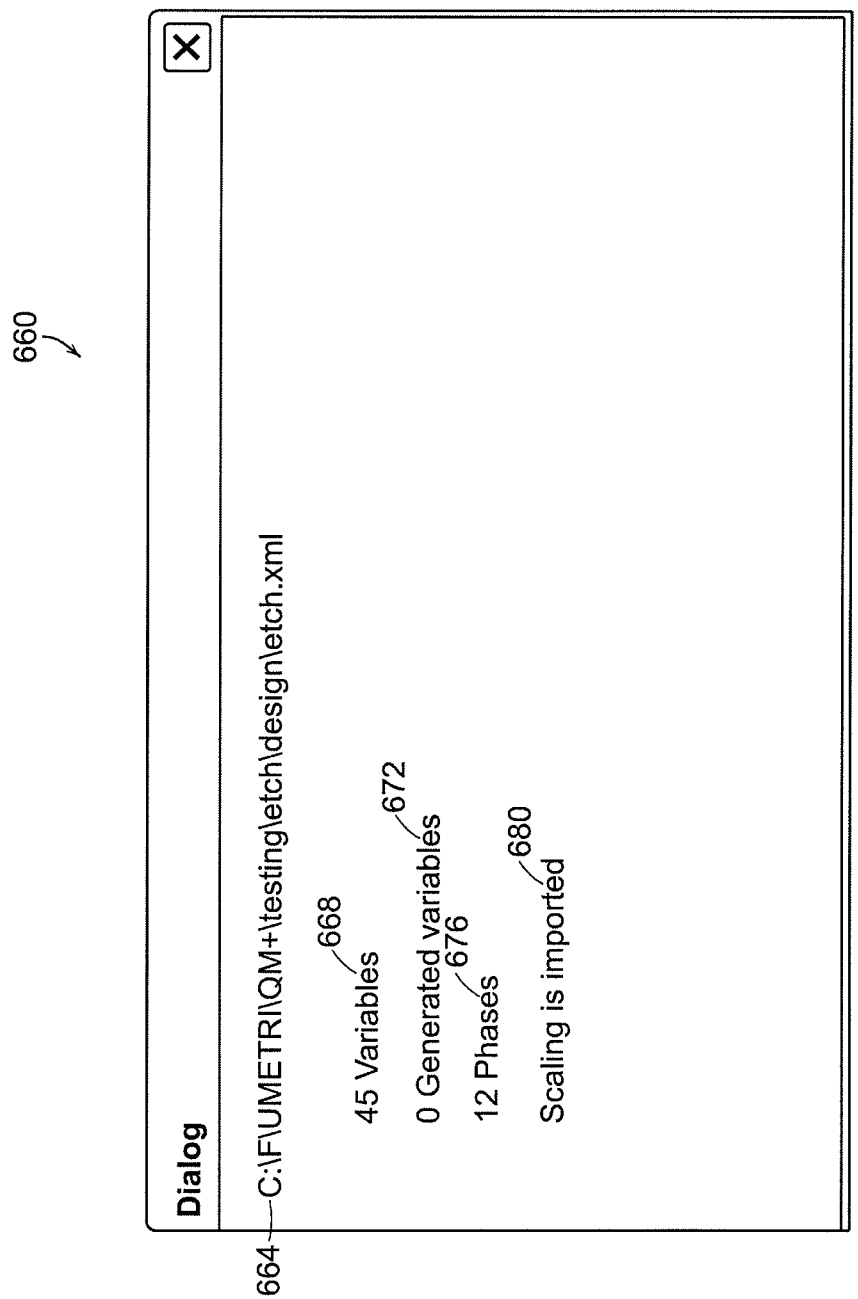

FIGS. 6A-6C are screen shots that illustrate an exemplary user interface and process for importing scaling values of variables. Scaling is sometimes referred to as pre-treatment of data, before the data are used for subsequent processing or model generation. The measured values of physical parameters (e.g., variables) often have substantially different numerical ranges, which results in a large statistical variance in the data. Principal component analysis and partial least squares are generally considered maximum variance projection methods. Hence, a variable or data with a large variance is likely to be more expressed in a model than a variable with a relatively low variance. When a variable with a relatively large variance is plotted in a scatter plot along an axis (e.g., an x-axis) against a variable with a relatively small variance is plotted in a scatter plot along an axis (e.g., the y-axis) with the same scale, the spread in the large-variance variable may dominate the spread in the small-variable variable. To avoid this, the data (and the axes) of both variables are scaled. Scaling the variables allows both variables to contribute to the particular data model.

In order to give both variables relatively or approximately equal weight, the data values are standardized, scaled, or weighted. This facilitates both variables contributing approximately equally to the model. The scaling process involves regulating the length of a coordinate axis in variable space according to a predetermined criteria (e.g., that the length of each coordinate axis be set to the same variance). A common technique for scaling data is referred to as "unit variance," "UV" scaling, or "auto-scaling." Unit variance scaling involves calculating a standard deviation for a particular variable from a data set. A scaling weight is calculated as the inverse of the standard deviation. Each value of the variable is multiplied by the scaling weight to determine a scaled variable. After all of the variables in the data set have been UV scaled, each of the coordinate axes have the same unit variance.

In some embodiments, the user may want to devalue particular variables (e.g., noisy variables or irrelevant variables) or increase the weight or importance of certain variables. The user can modify the scaling weights (e.g., and thus the variances) to achieve this objective for a particular data set. Other types of data transformation and scaling can be used and are within the scope of the technology. For example, logarithmic, negative logarithm, logit, square root, fourth root, inverse, or power transformation scaling can be used.

In addition to scaling, data are sometimes subjected to "centering" by subtracting the mean of each variable or some other suitable centering value from the measured variable value. The user interface allows the user to specify the type of centering (e.g., mean, median, set point, or other substractor) in addition to allowing the user to specify the value to be used for centering the data. In some embodiments, the centering values can be imported from a file. When values are not specified for certain variables, these variables can be scaled according to a UV scaling based on the calculated statistical values (e.g., mean and standard deviation) of the values for the variables. In some embodiments, a dynamic centering and scaling can be implemented upon new values for the centering values and standard deviations being supplied from a file at either regular or irregular intervals. The centering values can correspond to the setpoints of controlled variables.

FIG. 6A is a spreadsheet 600 representative of data to be used for scaling and centering of variables. The spreadsheet 600 includes a set of columns 604, each of which is associated with a particular processing tool or chamber. The spreadsheet also includes a first row 608 that includes the name of each of the processing tools, chambers, or processing steps (e.g., variables) in the set of columns 604. The spreadsheet also includes a set of rows 612 below the first row 608.

The set of rows 612 includes scaling parameters that are applied to the variables in the set of columns 604 (e.g., the data associated with the variables) according to user preference. Row 614 is labeled "stdev" and includes values of the standard deviation of the variables that the model generation module uses to compute scaling weights. Row 616 is labeled "ws" and includes values for the scaling weight the model generation module uses to weight the data from the variables when the model is generated. The scaling weight is a value that is the inverse of the standard deviation value (e.g., 1/stdev). Row 618 is labeled "percent" and includes values for specifying the value of the standard deviation as a percentage of the mean or average of the variable in the particular column in the set of columns 604.

Row 620 is labeled "modifier." The values in Row 620 are calculated by determining a scaling weight from the data in the data set, and then multiplying the scaling with the "modifier" value. Row 622 is labeled "mean" and includes the value that is the mean of the variable in the particular column in the set of columns 604 for using in centering data. The "mean" value allows the user to specify a reference value for the data notwithstanding the measured value of the mean.

In some embodiments, the values present in the cells of the spreadsheet 600 (e.g., in the set of columns 604 and the set of rows 612) can be imported from a scaling file that specifies the particular values. In some embodiments, the values in the cells of the spreadsheet 600 are manually entered by the user and saved to a memory for future use. The values on the cells of the spreadsheet 600 are used to perform scaling and centering of the particular data set. When values are not specified in certain columns (not shown) of the spreadsheet 600, the variables are scaled according to a unit variance scaling based on the calculated statistical values (e.g., mean and standard deviation) of the values for the variables.

When the user has specified the particular values in the spreadsheet 600, the user can then import the scaling values and/or apply them to the particular data used for the model. The user can import the scaling values by selecting the "Import Scale" selection 525 from the first drop-down menu 505 and then selecting the "Import Scaling" selection 530 of the second drop-down menu 510. Upon the user selecting the "Import Scaling" selection 530, the user interface window 640 of FIG. 6B appears. The user interface window 640 illustrates the scaling values after the scaling data (e.g., scaling file) has been imported. The user interface window 640 allows the user to confirm the scaling data has been accurately imported and applied to the particular variables (e.g., process tools and/or processing steps). The user selects the "Finish" button 644 when the scaling data is accurate, and the user interface window 660 of FIG. 6C opens.

The user interface window 660 provides a summary of the imported scaling data, including the name 664 of the scaling file (or the location of the file on the user's system). The user interface window 660 also includes the number of variables 668, the number of generated variables 672, the number of processing steps or phases 676, and a confirmation 680 that the scaling data was imported. Upon the scaling data being applied to the variables, the user can the specify model generation conditions and proceed to generate a model.

Figure 7A:
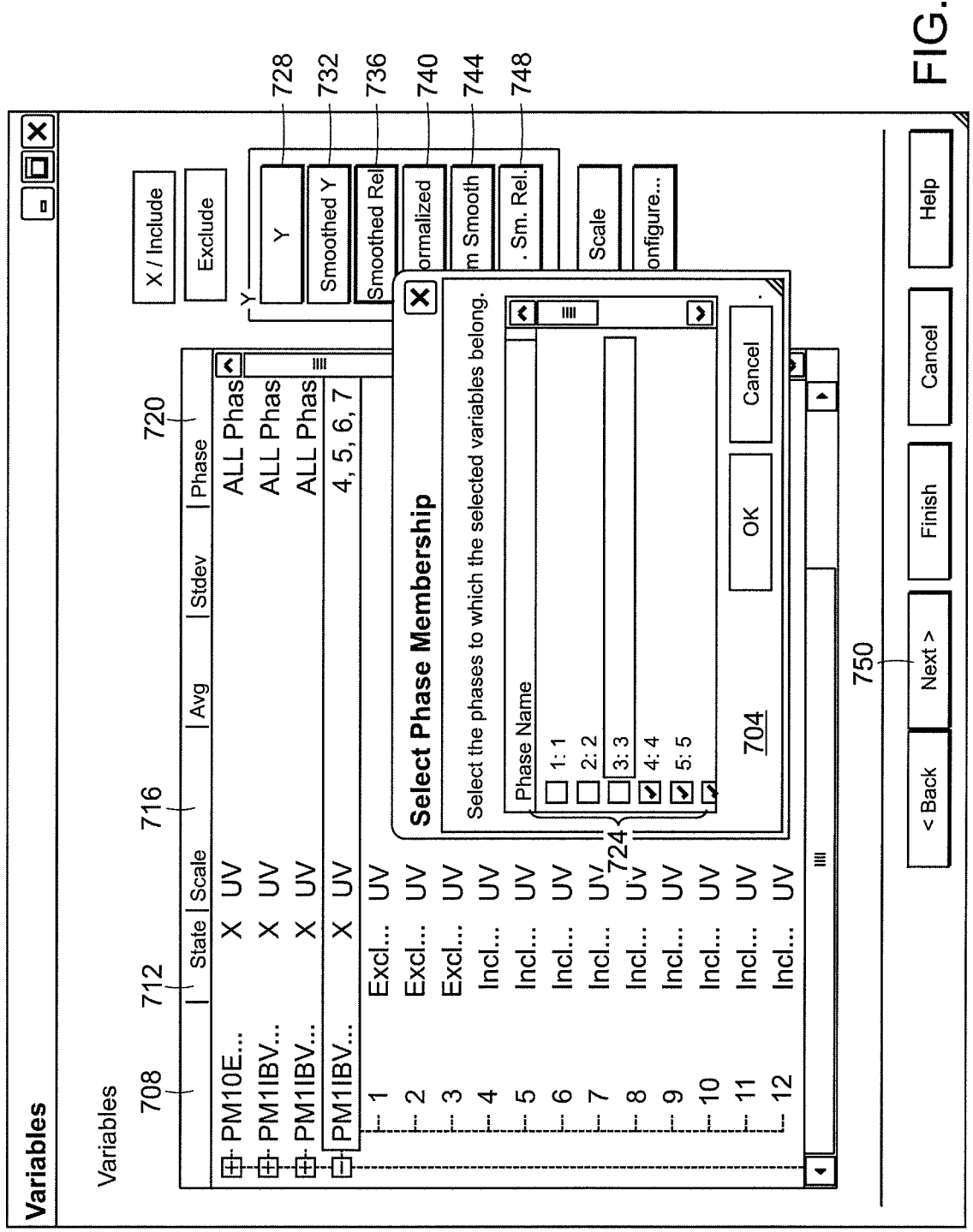
Figure 7C:
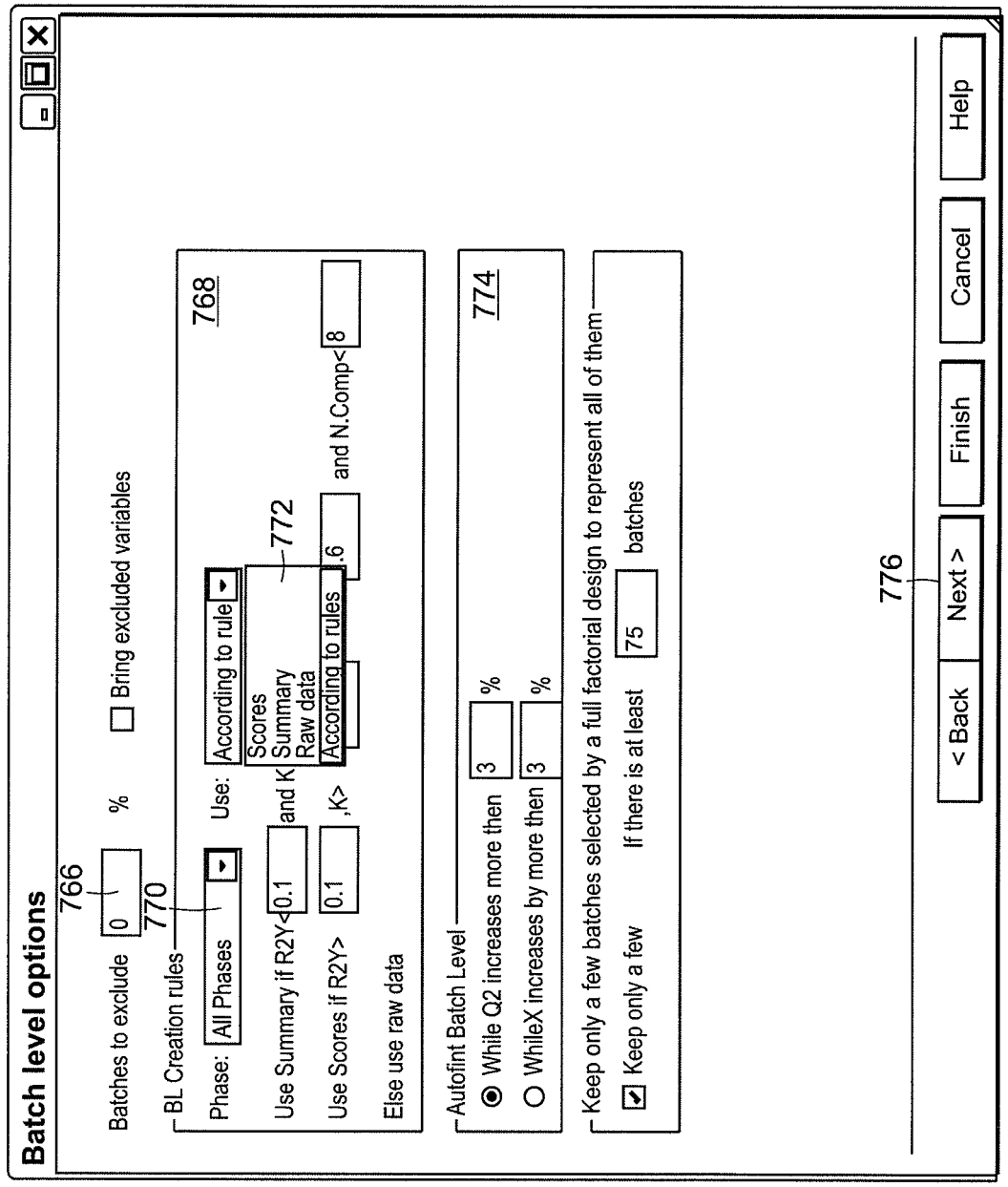

FIGS. 7A-7D are screen shots that illustrate an exemplary user interface and process for generating a model, including a batch model after specifications and options have been configured. FIG. 7A illustrates an exemplary user interface 700 and a selection user interface window 704. The user interface window 700 appears upon the user selecting the "Create Specifications" selection 520 of the first drop-down menu 505 of the user interface window 500 of FIG. 5A.

The user interface window 700 includes a list of names 708 of the variables to be included in the model. Each name is associated with a "State" 712, an indication of the scaling 716 applied to the variable, and which processing step or "Phase" 720 the data associated with the variable is applied to in the model. The user can select the processing steps or "Phase" that each set of data is applied to. For example, upon the user selecting a particular variable (e.g., "PM1IBV . . . ", the selection user interface window 704 appears. The selection user interface window 704 allows the user to specify which processing steps or "Phase" each variable should be applied to. As illustrated, the default is that the data for each variable is used for each processing step to generate the model. The user can exclude the data for particular variables from particular processing steps by "un-checking" the check boxes 724 in the selection user interface window 704. The user interface window 700 can be used to exclude variables from the model entirely, or to exclude variables from particular processing steps or phases.

The user interface window 700 also includes a button 728 that allows the user to specify a "Y" variable. In some embodiments, the Y variable is a time variable, such as validity time, maturity time, or other value that specifies how long a particular set of data should be used without updating. In embodiments in which the Y variable is a maturity time, the user can fit the maturity variable to a curve or a function (e.g., smooth the variable) by selecting the "Smoothed Y" button 732. When the Y variable is a maturity time, the user can also define the maturity time relative to other temporal values, e.g., by selecting the "Smoothed Rel" button 736. In some embodiments, the user does not specify a Y variable. A default Y variable can be used in such embodiments. An example of a default Y variable is "$Time," the Y variable can be linearized or normalized by selecting the "Normalized" button 740.

In some embodiments, the Y variable is a measured variable, for example, a time variable generated by the particular processing tool. The user can normalize or linearize the data and/or fit the data to a curve or relate it to other timing date, for example, by selecting the "Norm Smooth" button 744 and the "Norm Sm. Rel" button 748. Upon the user finishing associating variables with particular processing steps (phases), the user selects the "Next" button 750. Upon the user selecting the "Next" button 750 of the user interface window 700, the user interface window 752 of FIG. 7B appears.

The user interface window 752 allows the user to select particular data points or observations to be excluded from the model. The user interface window 752 includes a "Crop/Exclude" button 754 that allows the user to select particular data points or "observations" to be excluded from the model. The user can specify the data points or observations to be excluded in the first area 756 of the user interface window 752. Upon the user excluding particular data points or observations, an updated list of processing steps and data points appears in a second area 758 of the user interface window 752. After the user has customized or specified the observations or data points to be excluded from the model, the user can select the "Next" button 760. Upon the user selecting the "Next" button 760, the user interface window 764 of FIG. 7C appears.

The user interface window 764 includes a text-fillable field 766 that allows the user to specify the number of batches (e.g., wafers) to exclude from the model. In some embodiments, the default value of excluded batches is zero. The user interface window 764 also includes an area 768 that allows the user to specify "BL Creation rules" or "batch-level creation rules." A model can be generated based on the included processing steps or phases. The area 768 includes a drop-down menu 770 that allows the user to specify which processing steps or phases are included in the model. The area 768 also includes a second drop-down menu 772 that allows the user to specify how the included processing steps or phases are used to generate the model. The processing steps can be used based on user-specified scores (e.g., scores based on principal component analysis or partial least squares analysis, Hotelling $T^2$-type and/or DModX-type calculations), based on summary data, based on raw data, or "according to rules" specified by the user. In some embodiments, including the embodiment illustrated in FIG. 7C, the second drop-down menu 772 is applied to "All Phases," as shown in the first drop-down menu 770. In some embodiments, the user's selection from the second drop-down menu 772 can be used for individual or specified sets of processing steps or phases (rather than for "All Phases").

The user specifies processing rules using the second drop-down menu 772, and the model is generated according to the user-specified rules in some embodiments. The user interface window 764 also includes a second area 774 that allows the user to specify the manner of fitting the batch-level data to parameters of the model. The second area 774 allows the user to specify the number of components (e.g., data points) used to auto-fit the data in a particular model. Alternatively, the user can specify a percentage increase in Q2 or the X variable that exceeds a threshold value. Upon the specifying values within the user interface window 764, the batch-level model is fitted by a principal component analysis or partial least squares analysis (e.g., a projection onto a two-dimensional scatter plot). The principal component analysis model can be a default setting when the user does not specify a Y variable (or quality variable) when the data is imported (e.g., described above with respect to FIG. 7A.

Figure 7D:
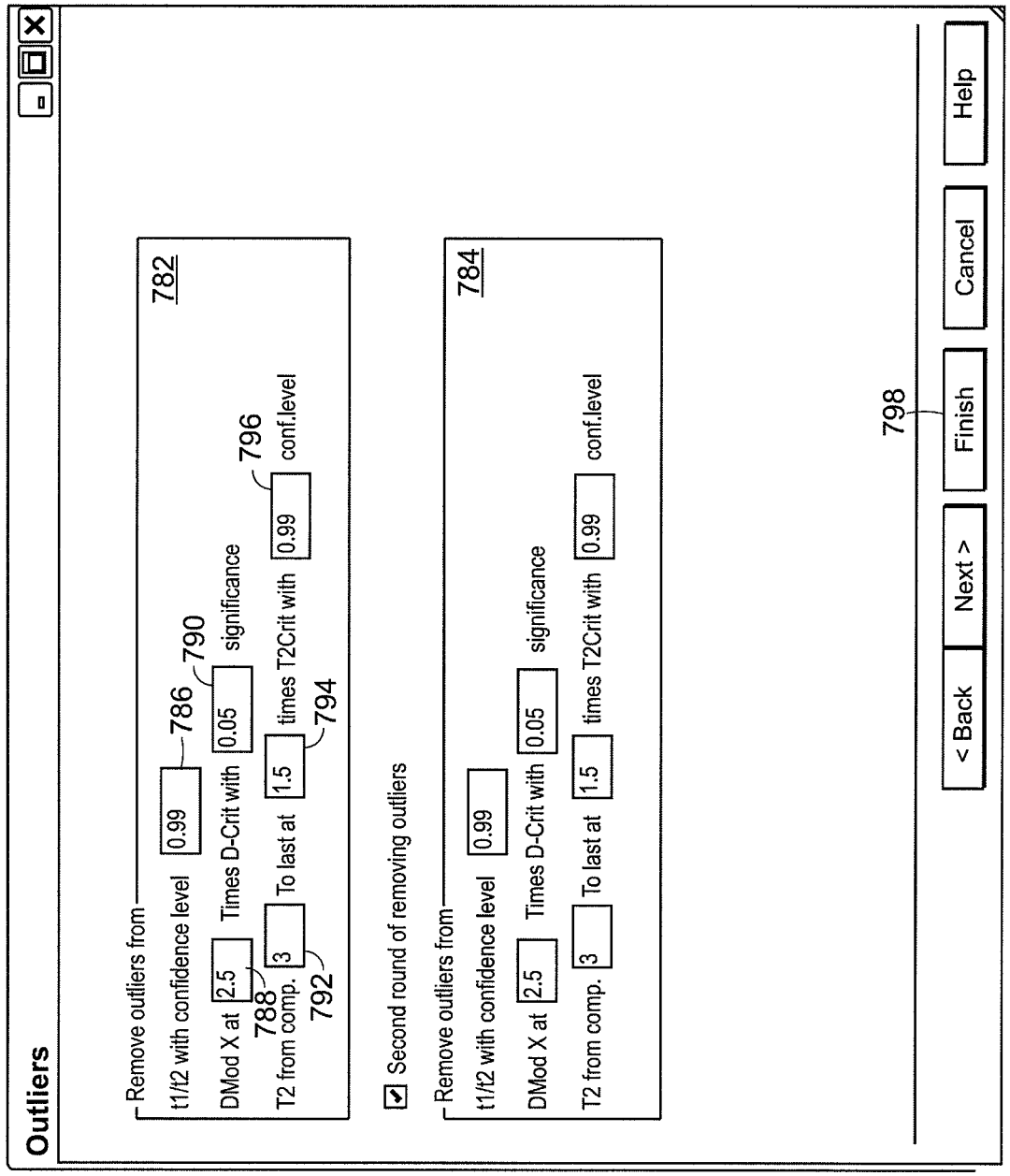

When the user has specified the batch-level specifications or rules, the user can select the "Next" button 776, and the user interface window 780 of FIG. 7D appears. The user interface window 780 allows the user to provide threshold parameters or conditions for generating the model and specify outlier conditions to be excluded from the generated model. FIG. 7D illustrates an "Outliers" user interface window 780 that allows a user to specify and further define features of the model. The "Outliers" user interface window 780 includes a set of fields that can be filled by a user to provide limits to the data that is included in the template. For example, the "Outliers" window allows the user to specify wafer data as outliers (e.g., data points that fall outside specified parameters), for example, when particular data points exceed a threshold value at a particular confidence level. Wafer data points of a subset of wafers can be analyzed during the model generation, for example, using a multivariate analysis module that determines whether data associated with particular wafers is consistent with other measured data. If particular wafer data points exceed the threshold value at the particular confidence level, these data points and/or wafers are not included when the model is generated.

The user interface window 780 includes a first area 782 and a second area 784. The first area 782 allows a user to specify outliers in the data set not included in the model building. The first area includes a text-fillable field 786 that allows the user to specify a "t1/t2 with confidence level" for specifying outliers from a principal component analysis statistical calculation of the data. As illustrated, the confidence level in the text-fillable field 786 is "0.99." Data points that fall outside the 99% confidence level of the principal component analysis are excluded from the model. The user can specify other values for the confidence level, e.g., 90%, 95%, 97%, or other values based on the user's preference or the suitability to the particular model.

The first area 782 also includes a text-fillable field 788 that allows the user to specify a critical or threshold value for a DModX-type calculation and a "significance" value in a second text-fillable field 790. As illustrated, the threshold value for the DModX calculation is "2.5" with a significance value of "0.05." Other values for the DModX calculation and significance value are within the scope of the technology. The first area 782 also includes a text-fillable field 792 that allows a user to specify the scores to include for a Hotelling $T^2$-type calculation. A second text-fillable area 794 that allows the user to specify a multiplier of the Hotelling $T^2$-type value at a particular, user-specified confidence level that appears in a third text-fillable field 796. The value illustrated for the first text-fillable field is 3. The value of the second text-fillable field 794 is 1.5, and the value of the third text-fillable field is 0.99. Other values for the first, second, and third text-fillable fields 792, 794, & 796 are within the scope of the technology. When the user has completed specifying the values, the user selects the "Finish" button 798. When the user has completed the processes illustrated in FIGS. 3A-7D, the model generation module 165 of FIG. 1 can generate a model (e.g., the model generation module 165 has sufficient data and conditions to construct a data structure or file called a model that specifies values for particular wafer or batch processing steps involving process steps from previous recipes).

Figure 8:
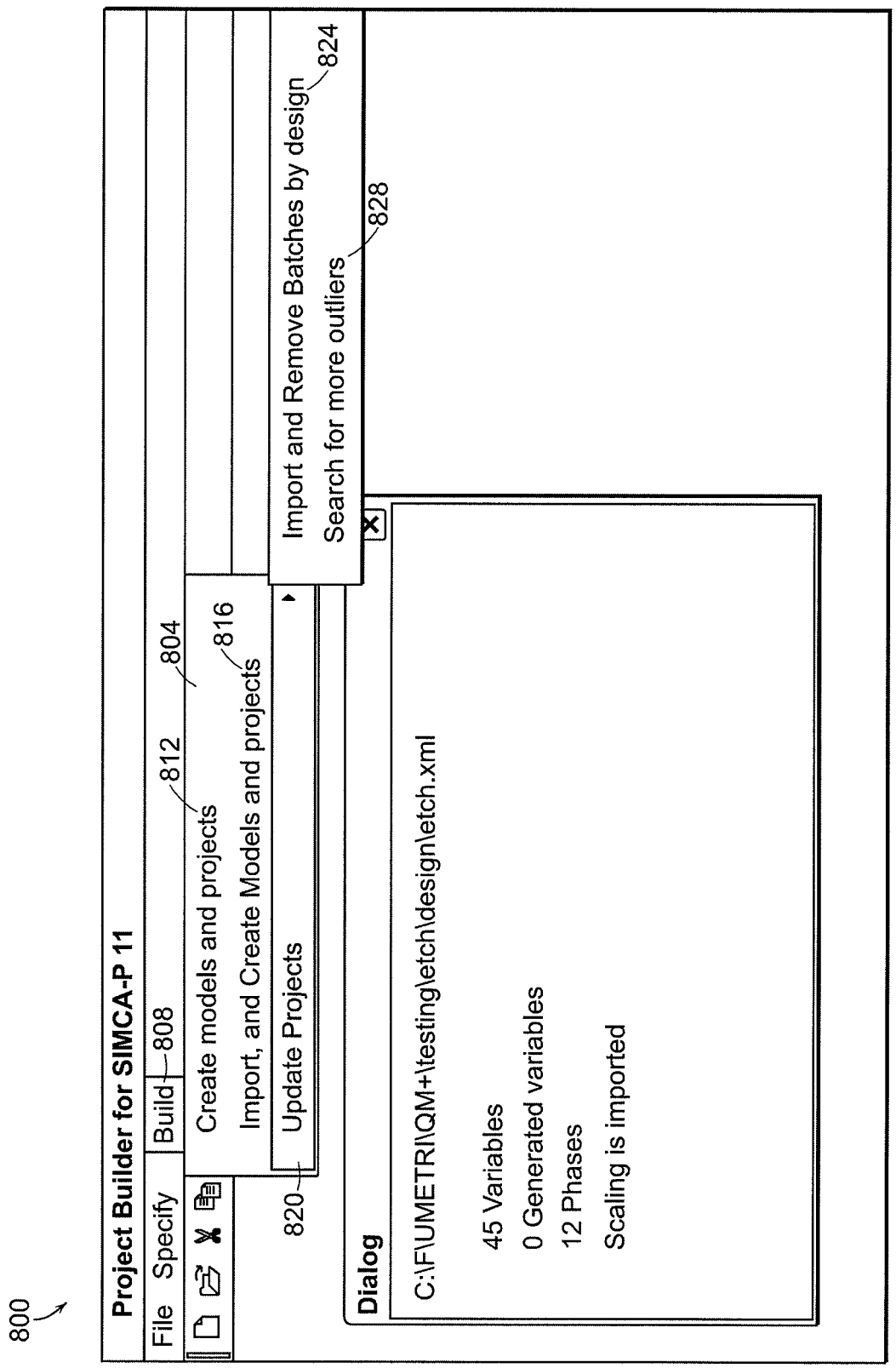
FIG. 8 is a screen shot of an exemplary user interface and process for generating a model from data.

FIG. 8 is a screen shot of an exemplary user interface window 800 and process for generating a model from data. The user interface window 800 includes a first drop-down menu 804 that appears upon the user selecting the "Build" tab 808. The first drop-down menu 804 includes a "Create models and projects" 812 selection, a "Import, and Create Models and projects" selection 816, and an "Update Projects" selection 820. Each of the selections 812, 816, and 820 are commands that the user can issue to the system (e.g., the processor 105 of FIG. 1) to generate a model, e.g., based on previous actions performed by the user and the processor.

The user selects the "Create models and projects" 812 when the user has imported the desired data and has specified the particular model-generation specifications. In some embodiments, the data has been scaled and/or outliers have been removed. The "Create models and projects" 812 command instructs the model generation module 165 to generate a model based on the data and the user specifications. The model can then be saved to a memory for future use. After the model has been generated, the model generation module 165 can calculate, display, and save statistics concerning the model.

In some embodiments, an existing file (e.g., a template) includes the model-generation specifications. For example, if the user has previously specified model generation conditions, those conditions can be saved in external memory (e.g., in an XML file). The user can then open the template with the saved specifications and apply the specifications to the particular data set that is used to generate the model. The user selects the "Import, and Create Models and projects" selection 816 when the user has opened the template containing the specifications. The selection 816 generates a command to the model generation module 165 to apply the specifications contained in the existing to the data. In some embodiments, the user completes the process for importing data discussed above with respect to FIGS. 3A-5D (e.g., specifying or selecting particular wafers or batches and particular processing steps or phases whose data will be used to generate the model). The model can then be saved to a memory for future use. After the model has been generated, the model generation module 165 can calculate, display, and save statistics concerning the model.

In some embodiments, a model can be generated from a previously-saved model with additions, deletions, or other modifications. The user can generate a model from a previously-saved model by selecting the "Update Projects" selection 820 in the first drop-down menu 804. For example, the user can remove data from particular wafers or particular processing steps from the model (e.g., using the "Import and Remove Batches by design" selection 824). The user can also update the model data by removing additional outlier data (e.g., using the "Search for more outliers" selection 828). After the user has made the desired modifications, the model generation module 165 can generate a new model based on the updated data and/or specifications. The model can then be saved to a memory for future use. After the model has been generated, the model generation module 165 can calculate, display, and save statistics concerning the model. In some embodiments, the model generation module 165 generates intermediate models in the process of generating a model based on the data and according to the user's specification. The intermediate models can also be saved in a memory and/or accessed or retrieved for future use. After the models have been generated, the user can save, load, and/or implement the models in the user's processing facility.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

The technology has been described in terms of particular embodiments. The alternatives described herein are examples for illustration only and not to limit the alternatives in any way. The steps of the technology can be performed in a different order and still achieve desirable results.

The invention claimed is:

1. A method for creating a new model of a manufacturing process according to a multivariate analysis, the method comprising:
   receiving, by a computing device, a plurality of sets of data, wherein the plurality of sets of data are multidimensional data measured during a step or phase of a manufacturing process for one or a plurality of wafers, and the step or phase is a process step from a plurality of process steps associated with manufacturing a wafer;

determining, by the computing device, a set of model generation conditions based on a user input selection that indicates which data from the plurality of sets of data to include in generating a new model, wherein the user input selection includes a maturity variable that indicates a degree of completion of a batch; and generating, by the computing device, the new model based on the set of model generation conditions, wherein the new model is used for monitoring during a future manufacturing process.

2. The method of claim 1, further comprising:

associating a set identifier or batch ID with each set of data of the plurality of sets of data and a step identifier or phase ID with the step of the manufacturing process during which each set of data of the plurality of sets of data was measured; and associating a time variable with each set of data of the plurality of sets of data.

3. The method of claim 1, further comprising excluding data not to be used during generation of the new model.

4. The method of claim 3, wherein excluding data comprises removing outliers from each set of data of the plurality of sets of data before the new model is generated.

5. The method of claim 3, wherein excluding the data comprises removing data that exceeds threshold parameters based on statistical calculations.

6. The method of claim 5, wherein the statistical calculations comprise at least one of a multivariate principal component analysis or partial least squares analysis.

7. The method of claim 6, wherein the multivariate principal component analysis or partial least squares analysis includes a Hotelling $T^2$-type calculation, a DModX calculation, or a combination thereof.

8. The method of claim 1, wherein each set of data of the plurality of sets of data includes raw data from one or more tools or data from an existing model.

9. The method of claim 1, wherein selecting further comprises importing raw data from one or more process tools or importing data from a previously-generated model.

10. The method of claim 9, further comprising scaling and centering of the imported data based on a unit variance or other statistical calculation.

11. The method of claim 9, wherein the imported data are adjusted according to a user-specified set of scaling and centering values before generation of the new model.

12. The method of claim 1, wherein the model generation conditions further comprise included variables, excluded variables, included process steps, excluded process steps, time variables, or any combination thereof.

13. The method of claim 1, wherein at least one maturity variable is smoothed or linearized, or the time variables are normalized or both.

14. The method of claim 1, wherein the measured multidimensional data satisfying a threshold condition triggers generating the new model.

15. The method of claim 14, wherein the threshold condition is satisfied when a multivariate analysis of the multidimensional data results in a value that exceeds a threshold value.

16. The method of claim 15, wherein the multivariate analysis involves a Hotelling $T^2$-type calculation, a DModX-type calculation, a weighted moving average-type calculation, or a multivariate control chart calculation, any of which are derived from a principal component analysis or a partial least squares analysis.

17. An apparatus for generating data structures indicative of conditions of a manufacturing process or current quality of output of a manufacturing process, the apparatus comprising a processor and memory configured to:

receive a plurality of sets of data, wherein the plurality of sets of data are multidimensional data measured during a step or phase of a manufacturing process for one or a plurality of wafers, and the step or phase is a process step from a plurality of process steps associated with manufacturing a wafer;

determine a set of model generation conditions based on a user input selection that indicates which data from the plurality of sets of data to include in generating a new model, wherein the user input selection includes a maturity variable that indicates a degree of completion of a batch; and generate a new model based on the set of model generation conditions, wherein the new model is used for monitoring during a future manufacturing process.

18. A system for creating or updating a model according to a multivariate analysis, the system comprising:

a user interface including:

(a) a first window allowing a user to select a plurality of sets of data, wherein the plurality of sets of data are multidimensional data measured during a step or phase of a manufacturing process for one or a plurality of wafers, and the step or phase is a process step from a plurality of process steps associated with manufacturing a wafer, to be used to generate a new model;

(b) a second window allowing a user to determine model generation specifications including data to be included in the generated model, data to be excluded from the generated model, and a maturity variable that indicates a degree of completion of a batch; and (c) an area for displaying the data to be used to generate the model; and a memory for storing the generated model, the generated model based on the set of model generation specifications, wherein the generated model is used for monitoring during a future manufacturing process.

19. The system of claim 18, further comprising a third window including a user-configurable spreadsheet portion to specify scaling, centering, or pre-processing values, procedures, or transformations for applying to the data before the model is generated.

* * * * *